(12) United States Patent
Ura et al.

(10) Patent No.: US 9,656,119 B2
(45) Date of Patent: May 23, 2017

(54) EXERCISE INFORMATION DISPLAY SYSTEM, EXERCISE INFORMATION DISPLAY METHOD, AND COMPUTER-READABLE STORAGE MEDIUM HAVING EXERCISE INFORMATION DISPLAY PROGRAM STORED THEREON

(71) Applicant: CASIO COMPUTER CO., LTD., Shibuya-ku, Tokyo (JP)

(72) Inventors: Kazuo Ura, Fussa (JP); Masao Sambongi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 446 days.

(21) Appl. No.: 14/137,192

(22) Filed: Dec. 20, 2013

(65) Prior Publication Data

US 2014/0188257 A1     Jul. 3, 2014

(30) Foreign Application Priority Data

Dec. 27, 2012  (JP) ................. 2012-284811

(51) Int. Cl.
   *A63B 24/00*   (2006.01)
   *A63B 71/06*   (2006.01)
   *G09B 19/00*   (2006.01)

(52) U.S. Cl.
   CPC ...... *A63B 24/0003* (2013.01); *A63B 24/0062* (2013.01); *A63B 71/06* (2013.01); *G09B 19/0038* (2013.01)

(58) Field of Classification Search
   CPC . A63B 24/00; A63B 24/0003; A63B 24/0006; A63B 2024/0009;

(Continued)

(56) References Cited

U.S. PATENT DOCUMENTS

| | | | | |
|---|---|---|---|---|
| 5,857,855 A | * | 1/1999 | Katayama | .......... A63B 24/0003 434/247 |
| 6,231,527 B1 | * | 5/2001 | Sol | ........................ A61B 5/1038 348/143 |

(Continued)

FOREIGN PATENT DOCUMENTS

| | | |
|---|---|---|
| EP | 0816986 A2 | 1/1998 |
| JP | 10-222668 A | 8/1998 |

(Continued)

OTHER PUBLICATIONS

Japanese Office Action dated Oct. 7, 2014 issued in counterpart Japanese Application No. 2012-284811.

(Continued)

*Primary Examiner* — Kang Hu
*Assistant Examiner* — Anh Vo V Nguyen
(74) *Attorney, Agent, or Firm* — Holtz, Holtz & Volek PC

(57) ABSTRACT

An exercise information display system of the present invention includes a sensor device which obtains data associated with a motion status of a human body during an exercise, a data processing device which generates plural types of exercise information based on the data obtained by the sensor device, and a viewing device which displays, from among the plural types of exercise information, at least first information indicating a posture of the human body during the exercise and second information associated with the first information in a display format where the first information and the second information are displayed in conjunction with each other.

10 Claims, 22 Drawing Sheets

(58) Field of Classification Search
CPC .... A63B 2024/0012; A63B 2024/0015; A63B 71/0619; A63B 2208/02; A63B 2230/62; A63B 71/06; A63B 24/0062
See application file for complete search history.

(56) References Cited

U.S. PATENT DOCUMENTS

| | | | |
|---|---|---|---|
| 6,571,193 B1 | 5/2003 | Unuma et al. | |
| 7,254,516 B2 | 8/2007 | Case, Jr. et al. | |
| 7,603,255 B2 | 10/2009 | Case, Jr. et al. | |
| 7,634,379 B2* | 12/2009 | Noble | A61B 5/1116 702/141 |
| 7,704,157 B2* | 4/2010 | Shirai | A63B 24/0003 434/252 |
| 8,007,450 B2* | 8/2011 | Williams | A61B 5/112 600/449 |
| 8,086,421 B2 | 12/2011 | Case, Jr. et al. | |
| 8,112,251 B2 | 2/2012 | Case, Jr. et al. | |
| 8,425,292 B2* | 4/2013 | Lui | A63B 71/06 463/3 |
| 8,545,417 B2* | 10/2013 | Banet | A61B 5/0402 600/529 |
| 8,550,819 B2* | 10/2013 | Anderson | A63B 69/3623 434/247 |
| 8,579,834 B2* | 11/2013 | Davis | A61B 5/0031 600/509 |
| 8,581,731 B2* | 11/2013 | Purks | A61B 5/1038 340/573.1 |
| 8,708,934 B2* | 4/2014 | Skelton | A61B 5/103 600/595 |
| 9,050,471 B2* | 6/2015 | Skelton | A61N 1/36139 |
| 9,339,209 B2* | 5/2016 | Banet | A61B 5/0816 |
| 9,357,949 B2* | 6/2016 | Drew | A61B 5/061 |
| 2002/0042703 A1* | 4/2002 | Furusu | G09B 23/30 703/11 |
| 2002/0170193 A1 | 11/2002 | Townsend et al. | |
| 2003/0208335 A1 | 11/2003 | Unuma et al. | |
| 2004/0015103 A1* | 1/2004 | Aminian | A61B 5/1116 600/595 |
| 2004/0049103 A1* | 3/2004 | McFarland | A61B 5/4561 600/300 |
| 2004/0077975 A1* | 4/2004 | Zimmerman | A61B 5/1116 600/595 |
| 2005/0126026 A1 | 6/2005 | Townsend et al. | |
| 2005/0179202 A1* | 8/2005 | French | A63B 24/0003 273/247 |
| 2006/0040755 A1* | 2/2006 | Choi | A63B 24/0003 473/131 |
| 2007/0073514 A1* | 3/2007 | Nogimori | A61B 5/1038 702/160 |
| 2007/0118056 A1* | 5/2007 | Wang | A61B 5/1116 600/595 |
| 2007/0129769 A1* | 6/2007 | Bourget | A61B 5/0002 607/45 |
| 2007/0169364 A1 | 7/2007 | Townsend et al. | |
| 2007/0255118 A1* | 11/2007 | Miesel | A61B 5/0205 600/300 |
| 2008/0082001 A1* | 4/2008 | Hatlestad | A61B 5/02405 600/481 |
| 2009/0040231 A1 | 2/2009 | Sano et al. | |
| 2010/0022351 A1* | 1/2010 | Lanfermann | A61B 5/1114 482/1 |
| 2010/0156653 A1* | 6/2010 | Chaudhari | G01C 9/00 340/686.1 |
| 2010/0280418 A1* | 11/2010 | Klose | A61B 5/1114 600/595 |
| 2011/0021317 A1 | 1/2011 | Lanfermann | |
| 2011/0039659 A1* | 2/2011 | Kim | A63B 24/0006 482/8 |
| 2011/0054364 A1* | 3/2011 | Mitsui | A61H 1/0292 601/5 |
| 2011/0072457 A1* | 3/2011 | Lanfermann | A63B 24/0006 725/34 |
| 2011/0158546 A1* | 6/2011 | Huang | G06F 3/011 382/224 |
| 2012/0000300 A1 | 1/2012 | Sunagawa et al. | |
| 2012/0015334 A1* | 1/2012 | Hamilton | A63B 71/0622 434/247 |
| 2012/0078396 A1 | 3/2012 | Case, Jr. et al. | |
| 2012/0165704 A1* | 6/2012 | Kang | A61H 1/0237 600/595 |
| 2012/0183939 A1* | 7/2012 | Aragones | A63B 24/0006 434/247 |
| 2012/0183940 A1* | 7/2012 | Aragones | G06F 19/3437 434/247 |
| 2012/0215076 A1* | 8/2012 | Yang | A61B 5/0205 600/301 |
| 2012/0253234 A1* | 10/2012 | Yang | A61B 5/1038 600/595 |
| 2013/0090574 A1 | 4/2013 | Kuribayashi et al. | |
| 2013/0110004 A1* | 5/2013 | McLane | A61B 5/4561 600/587 |
| 2013/0178960 A1* | 7/2013 | Sheehan | G06F 17/40 700/91 |
| 2014/0106892 A1* | 4/2014 | Lin | G09B 19/0038 473/222 |
| 2014/0180449 A1* | 6/2014 | Sung | A63B 71/0622 700/91 |

FOREIGN PATENT DOCUMENTS

| | | |
|---|---|---|
| JP | 2004-344418 A | 12/2004 |
| JP | 2005-348860 A | 12/2005 |
| JP | 2008-524589 A | 7/2008 |
| JP | 2009-039157 A | 2/2009 |
| JP | 2009106377 A | 5/2009 |
| JP | 2009106390 A | 5/2009 |
| JP | 2010172481 A | 8/2010 |
| JP | 2011019669 A | 2/2011 |
| JP | 2011078728 A | 4/2011 |
| JP | 2011251013 A | 12/2011 |
| WO | WO 2006/065679 A2 | 6/2006 |
| WO | 2009027917 A1 | 3/2009 |

OTHER PUBLICATIONS

Extended European Search Report (EESR) dated May 27, 2014 issued in counterpart European Patent Application No. 13198394.2.

* cited by examiner

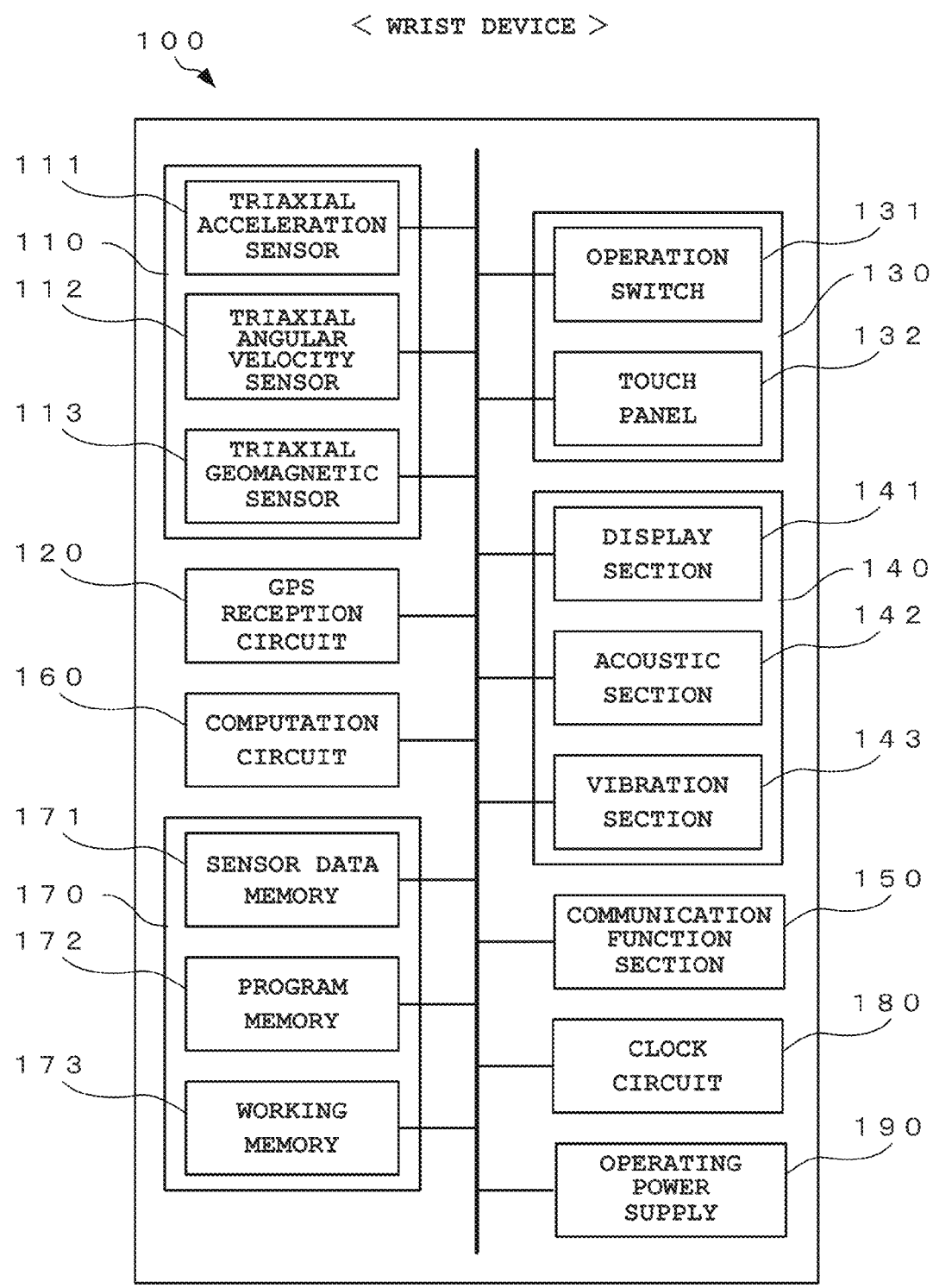

< INFORMATION COMMUNICATION TERMINAL >

EXERCISE INFORMATION DISPLAY SYSTEM, EXERCISE INFORMATION DISPLAY METHOD, AND COMPUTER-READABLE STORAGE MEDIUM HAVING EXERCISE INFORMATION DISPLAY PROGRAM STORED THEREON

CROSS-REFERENCE TO RELATED APPLICATION

This application is based upon and claims the benefit of priority from the prior Japanese Patent Application No. 2012-284811, filed Dec. 27, 2012, the entire contents of which are incorporated herein by reference.

BACKGROUND OF THE INVENTION

1. Field of the Invention

The present invention relates to an exercise information display system, an exercise information display method, and a computer-readable storage medium having an exercise information display program stored thereon. Specifically, the present invention relates to an exercise information display system, an exercise information display method, and a computer-readable storage medium having an exercise information display program stored thereon by which a user can accurately and easily grasp his or her posture and the like when exercising.

2. Description of the Related Art

In recent years, because of rising health consciousness, more and more people are performing daily exercises, such as running, walking, and cycling, to maintain their wellness or improve their health condition. These people are highly conscious of and interested in measuring and recording their own health condition and exercise condition by using numerical values or data. Currently, various technologies and products for fulfilling these demands have been developed, in which a health condition and an exercise status can be grasped by, for example, a footstep, a movement distance, a heart rate, a calorie consumption amount, and the like being measured and recorded.

For example, a technology is known in which position data obtained by a GPS (Global Positioning System) receiver and various data regarding biological information and an exercise status such as a heart rate and a movement speed are associated with each other and displayed on a display, as described in Japanese Patent Application (Kohyo) Publication No. 2008-524589.

Also, a technology is known in which various data indicating biological information and an exercise status obtained at an arbitrary point on an exercise route by a GPS receiver are displayed by characters patterned in advance and superimposed on a map displayed on a display, as described in, for example, Japanese Patent Application Laid-Open (Kokai) Publication No. 2009-039157.

In the people continuing daily exercises with the aim of maintaining their wellness or improving their health condition, the number of people are increasing who conduct harder training with the aim of participating in a competition such as a marathon race. In those with the aim of participating in competitions, there is a growing demand for achieving a successful record in a competition by grasping and analyzing their own exercise status from a more technical and scientific point of view and reflecting the analysis results to their daily training.

The exercise status display methods of the above-described technologies have a feature for this demand, in which various data of a heart rate and a movement speed are displayed as a gage, scale, characters, or the like on a display in association with an exercise route, and thereby biological information and an exercise status can be easily grasped.

However, in the methods of the above-described technologies, information regarding an exercise posture, such as the actual tilt of a body, the swing of an arm, and the length of stride during running is not provided. Accordingly, there is a problem in that biological information and various data obtained during an exercise are not sufficiently reflected to daily training.

SUMMARY OF THE INVENTION

In accordance with one aspect of the present invention, there is provided an exercise information display system comprising: a sensor device which obtains data associated with a motion status of a human body during an exercise; a data processing device which generates plural types of exercise information based on the data obtained by the sensor device; and a viewing device which displays, from among the plural types of exercise information, at least first information indicating a posture of the human body during the exercise and second information associated with the first information in a display format where the first information and the second information are displayed in conjunction with each other.

In accordance with another aspect of the present invention, there is provided an exercise information display method comprising: a step of obtaining data associated with a motion status of a human body during an exercise; a step of generating plural types of exercise information based on the obtained data; a step of displaying, from among the plural types of exercise information, at least first information indicating a posture of the human body during the exercise and second information associated with the first information in a display format where the first information and the second information are displayed in conjunction with each other.

In accordance with another aspect of the present invention, there is provided a non-transitory computer-readable storage medium having stored thereon an exercise information display program that is executable by a computer, the program being executable by the computer to perform functions comprising: processing for generating plural types of exercise information based on data associated with a motion status of a human body during an exercise; and processing for displaying, from among the plural types of exercise information, at least first information indicating a posture of the human body during the exercise and second information associated with the first information in a display format where the first information and the second information are displayed in conjunction with each other.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a block diagram showing a structural example of a wrist-mount-type sensor device applied in the exercise information display system according to the embodiment;

DETAILED DESCRIPTION OF THE PREFERRED EMBODIMENTS

Hereafter, embodiments of an exercise information display system, an exercise information display method, and an exercise information display program according to the present invention are described in detail below. In the following description, a case is described in which a user performs a running exercise.

(Exercise Information Display System)

Figure 1:
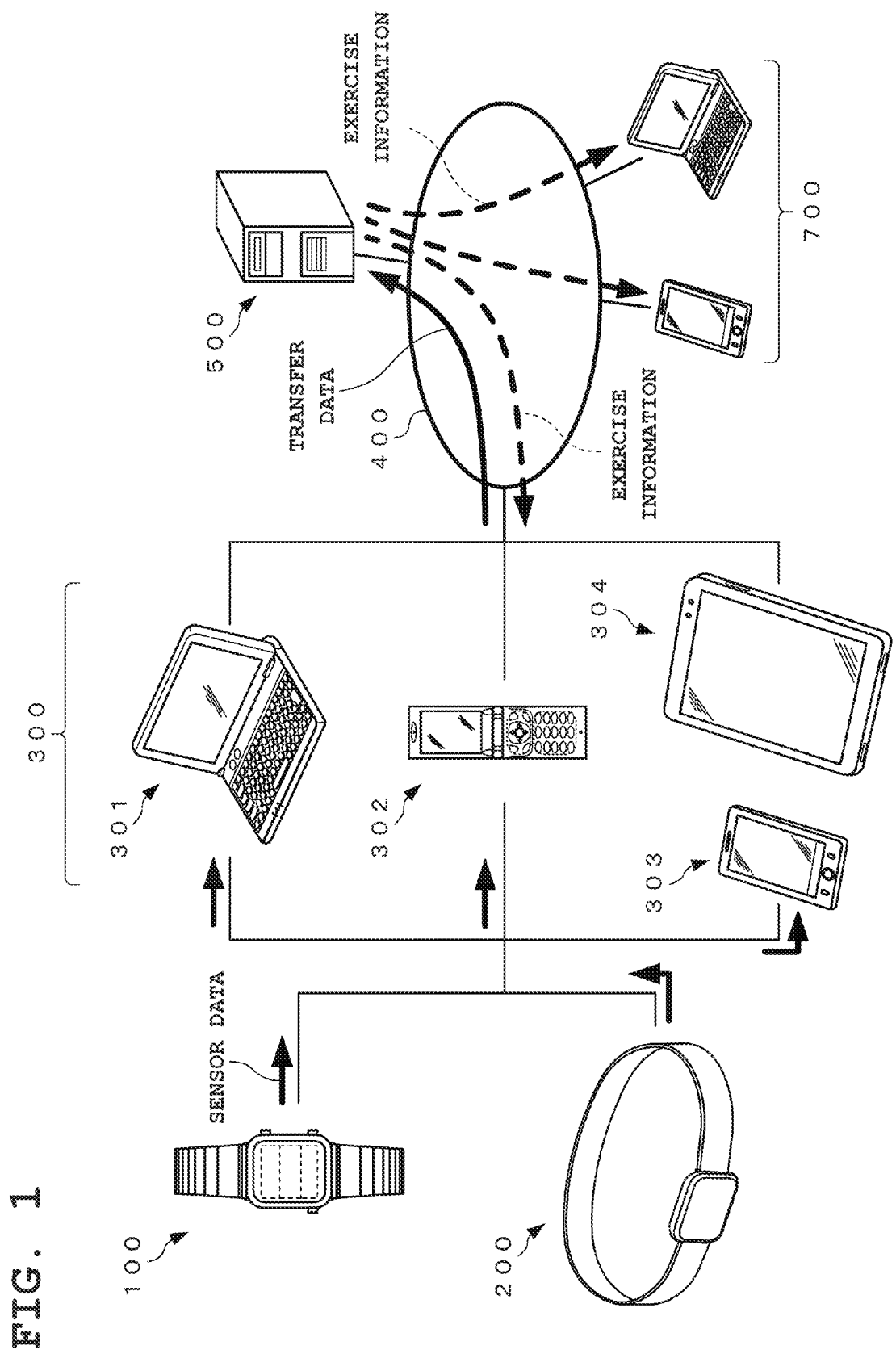
FIG. 1 is a schematic structural diagram showing an embodiment of an exercise information display system according to the present invention.
Figure 2A:
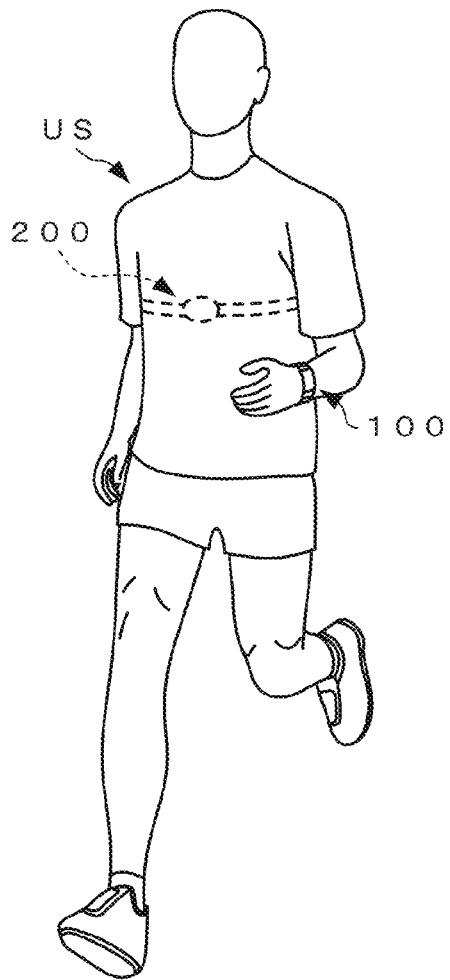
FIG. 2A to FIG. 2C are schematic structural diagrams showing an example of sensor devices applied in the exercise information display system according to an embodiment.
Figure 2B:
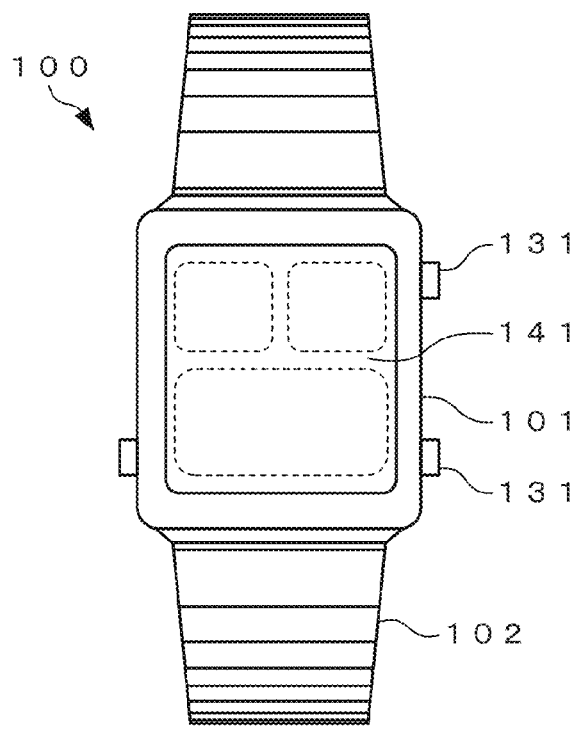
Figure 2C:
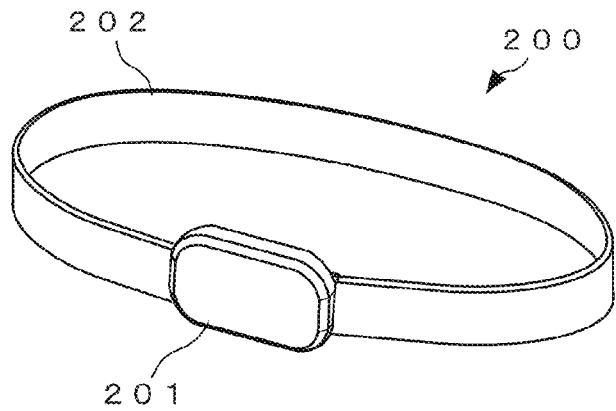
Figure 4:
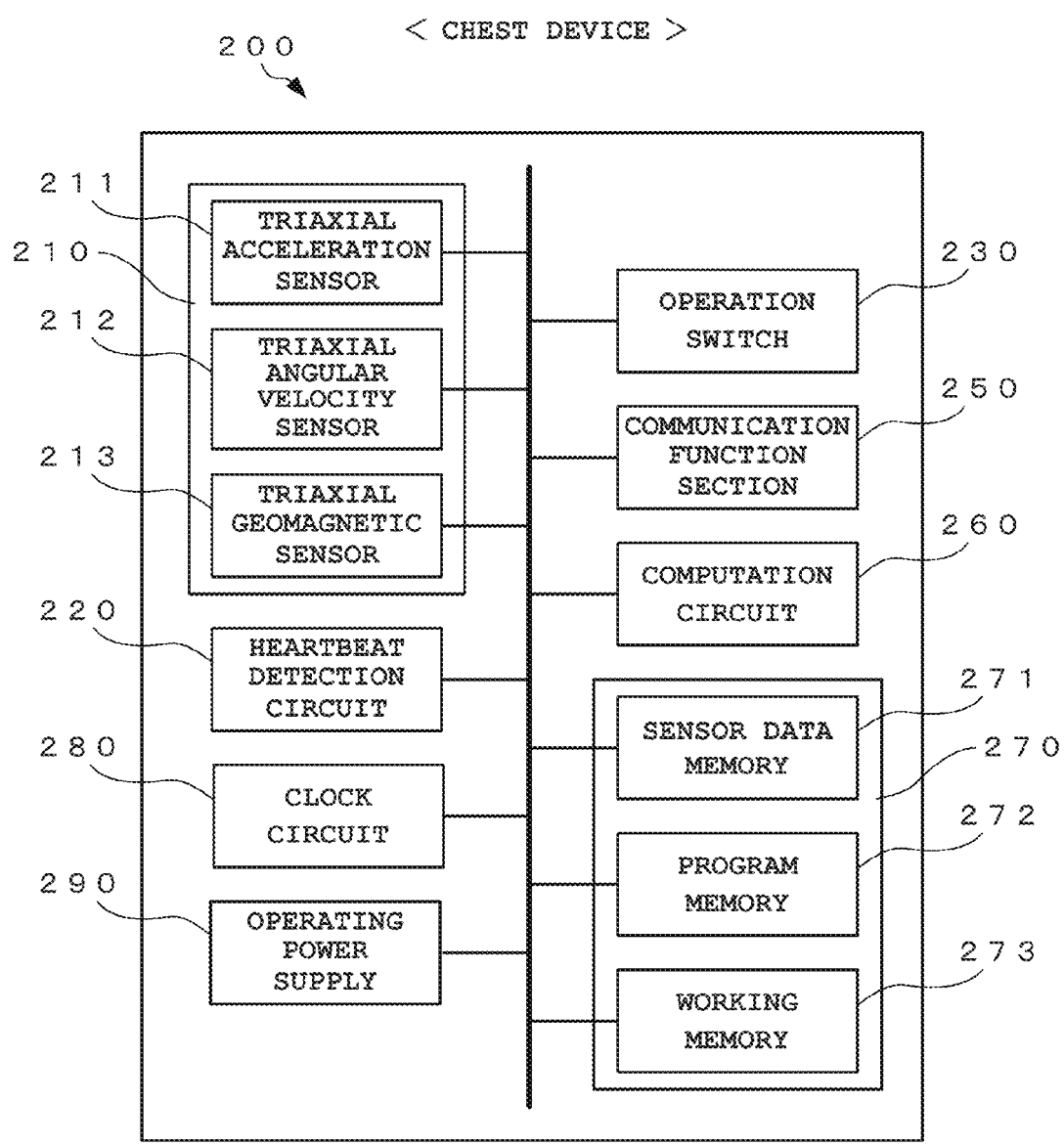
FIG. 4 is a block diagram showing a structural example of a chest-mount-type sensor device applied in the exercise information display system according to the embodiment.
Figure 5:
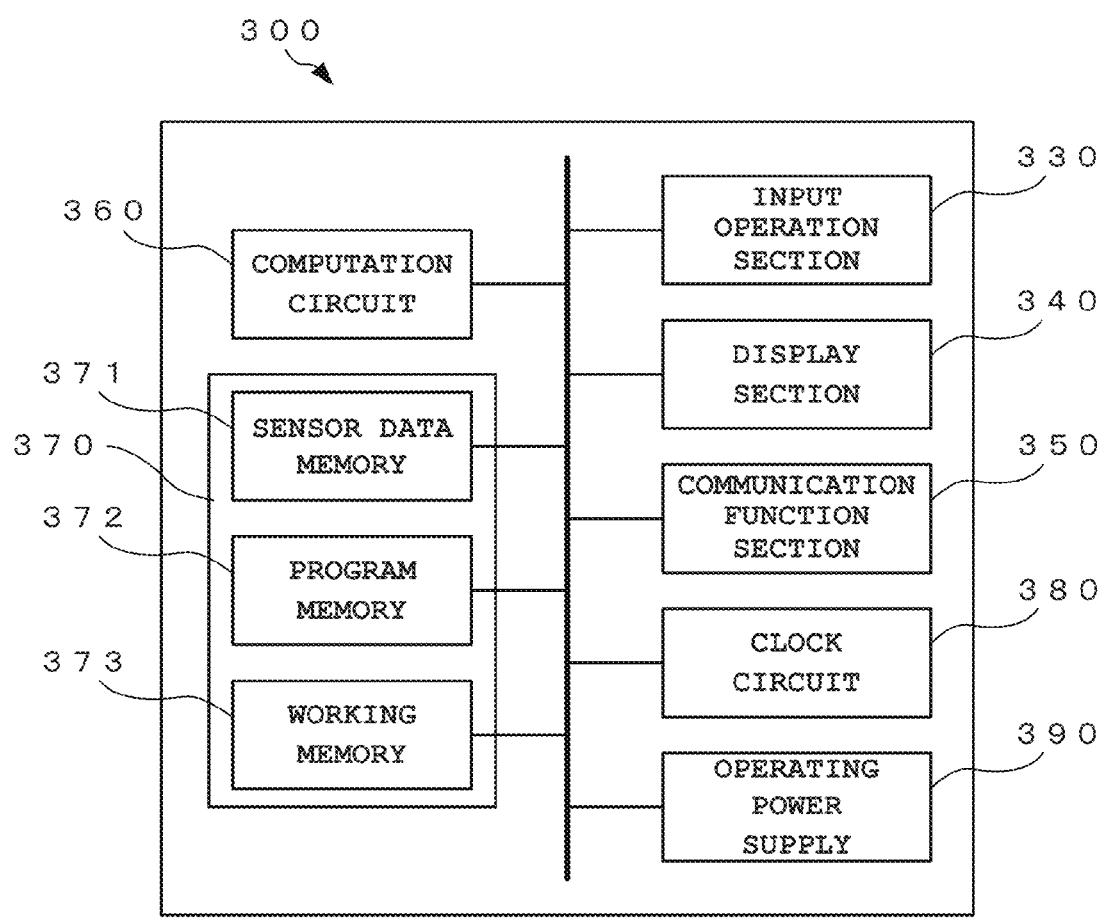
FIG. 5 is a block diagram showing a structural example of an information communication terminal applied in the exercise information display system according to the embodiment.
Figure 6:
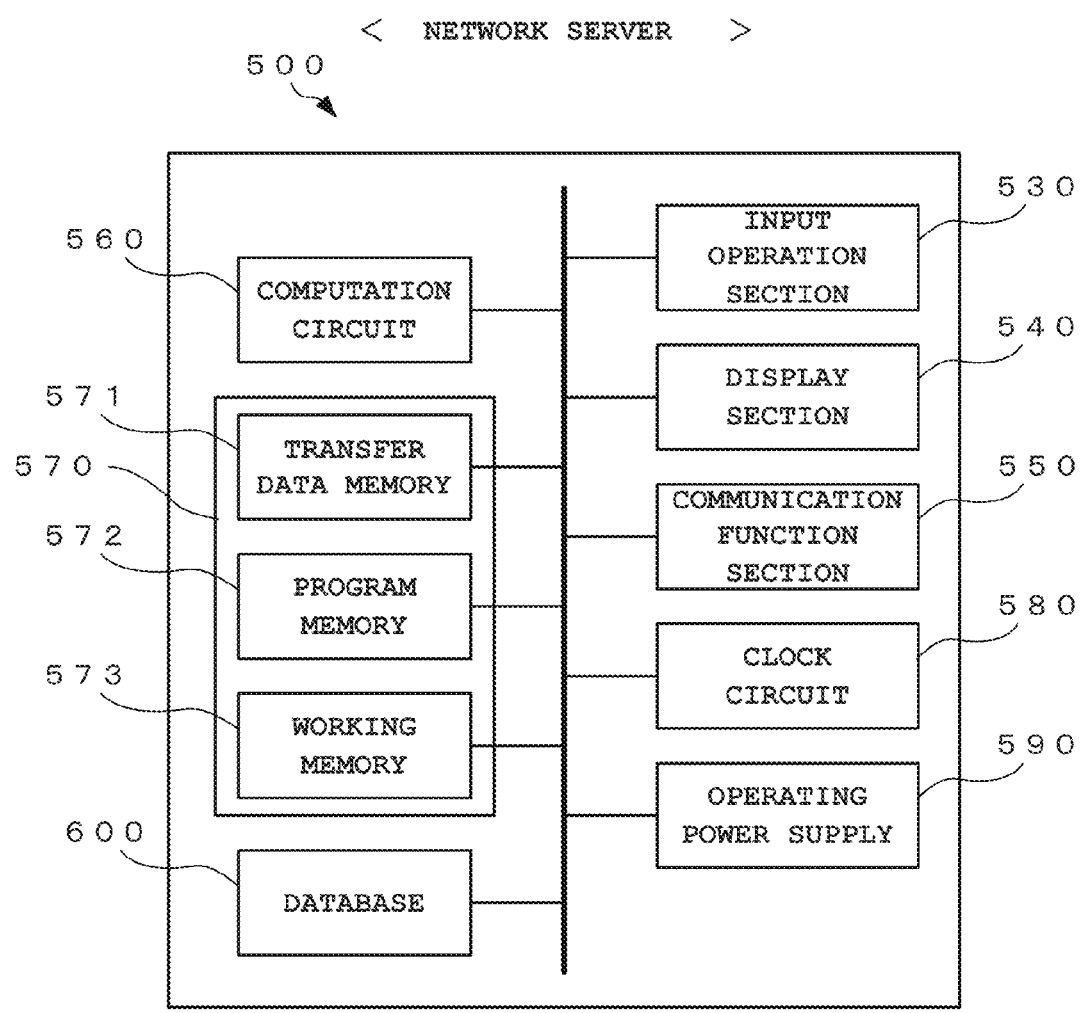
FIG. 6 is a block diagram showing a structural example of a network server applied in the exercise information display system according to the embodiment.

FIG. 1 is a schematic structural diagram showing an embodiment of the exercise information display system according to the present invention. FIG. 2A to FIG. 2C are schematic structural diagrams showing an example of sensor devices applied in the exercise information display system according to the present embodiment. FIG. 3 is a block diagram showing a structural example of a wrist-mount-type sensor device applied in the exercise information display system according to the present embodiment. FIG. 4 is a block diagram showing a structural example of a chest-mount-type sensor device applied in the exercise information display system according to the present embodiment. FIG. 5 is a block diagram showing a structural example of an information communication terminal applied in the exercise information display system according to the present embodiment. FIG. 6 is a block diagram showing a structural example of a network server applied in the exercise information display system according to the present embodiment.

The exercise information display system according to the present embodiment mainly has a wrist mount type sensor device (hereinafter referred to as a "wrist device" for convenience of explanation) 100 or a chest mount type sensor device (hereinafter referred to as a "chest device" for convenience of explanation) 200 which are worn on the body of a user US who is a measurement subject, an information communication terminal 300, a network 400, and data processing device such as a network server 500, and an user terminal 700, as depicted in FIG. 1, FIG. 2A, FIG. 2B and FIG. 2C.

(Wrist Device 100)

The wrist device 100 is a wristwatch-type or a wristband-type sensor device that is worn on a wrist of the user US, as depicted in FIGS. 2A and 2B. The wrist device 100 has an outer appearance structure mainly including a device body 101 which detects the exercise status and the position of the user US and provides predetermined information to the user US, and a band section 102 that is wound around a wrist of the user US so as to mount the device body 101 on the wrist.

Specifically, the wrist device 100 mainly includes a sensor section 110, a GPS reception circuit 120, an input interface section 130, an output interface section 140, a communication function section 150, a computation circuit 160, a memory section 170, a clock circuit 180, and an operating power supply 190, as depicted in FIG. 3.

The sensor section 110 is a motion sensor for detecting a motion of a human body (in particular, the swing of an arm, a cycle of exercise, the tilting status of the wrist device 100, etc.). This sensor section 110 has, for example, a triaxial acceleration sensor 111, a triaxial angular velocity sensor (a gyro sensor) 112, and a triaxial geomagnetic sensor (an electronic compass) 113, as depicted in FIG. 3. The triaxial acceleration sensor 111 detects a ratio of change in operation speed (acceleration) during the exercise of the user US and outputs acceleration data thereof. Here, acceleration data in three axis directions orthogonal to each other is outputted. The triaxial angular velocity sensor 112 detects a change in a motion direction (angular velocity) during the exercise of the user US and outputs angular velocity data thereof. Here, angular velocity data in three axis directions orthogonal to each other is outputted. The triaxial geomagnetic sensor 113 detects the magnetic field of earth and outputs geomagnetic data thereof or directional data indicating the horizontal and vertical directions of the wrist device 100. Here, geomagnetic data in three axis directions orthogonal to each other is outputted. Sensor data obtained by detection by these various sensors 111 to 113 (acceleration data, angular velocity data, and geomagnetic data) is associated with time data defined by the clock circuit 180 described below, and stored in a predetermined storage area of a sensor data storage memory 171 of the memory section 170 described below.

The GPS reception circuit 120 receives electric waves from a plurality of GPS satellites via a GPS antenna (omitted in the drawing) so as to detect a geographic position based on latitude and longitude information and an altitude (elevation) of that position, and outputs position data and altitude data. This GPS reception circuit 120 uses a Doppler shift effect of electric waves from the GPS satellites to detect the movement speed of the user US and output movement speed data thereof. As with the sensor data described above, GPS data including these position data and movement speed data is associated with time data defined by the clock circuit 180, and stored in a predetermined storage area of the sensor data storage memory 171 of the memory section 170. As described above, in the GPS reception circuit 120, the altitude data is obtained in addition to the position data. However, with the accuracy and technical specifications of present GPS reception signals, the altitude data has a large error, and sufficiently practical altitude information cannot be obtained. Therefore, the altitude data is not necessarily required to be obtained. In this case, for example, by using a map information service provided in the network 400 such as the Internet, more accurate altitude data can be obtained based on the position data included in the GPS data.

The input interface section 130 has, for example, an operation switch 131 and a touch panel 132, as depicted in FIG. 3. The operation switch 131 is, for example, a press-button-type switch provided projecting to a side surface of the device body 101 as depicted in FIG. 2B, which is used for various input operations such as an operation for controlling a sensing action in various sensors provided on the above-described sensor section 110 and an operation for setting an item to be displayed on a display section 141.

The touch panel 132 is arranged on the front surface side (view field side) of the display section 141 of the output interface section 140 described below, or is integrally formed on the front surface side of the display section 141. With a touch operation on an area corresponding to information displayed on the display section 141, a function corresponding to the information is selectively performed. Note that functions to be achieved by the touch panel 132 may be equivalent to functions that are achieved by the operation switch 131 described above, or may be functions unique to input operations by the touch panel 132. Also, the input interface section 130 may be structured to include only one of the operation switch 131 and the touch panel 132 described above.

The output interface section 140 has, for example, the display section 141, an acoustic section 142, and a vibration section 143, as depicted in FIG. 3. The display section 141 has a display panel of, for example, a liquid-crystal type capable of color or monochrome display or a light-emitting-element-type such as an organic EL (Electro Luminescence) element, and displays at least sensor data detected by the sensor section 110 described above, GPS data detected by the GPS reception circuit 120, various exercise information generated based on these sensor data and GPS data, time information such as a current time, or the like. The output interface section 140 may display sensor data and heartbeat data transmitted from the chest device 200 described below, various exercise information generated based on these sensor data and heartbeat data, and the like. Note that modes for displaying various types of information by the display section 141 are arbitrarily set by operating the operation switch 131 or the touch panel 132 described above.

The acoustic section 142 has an acoustic device such as a buzzer or a loudspeaker. By generating sound information such as a predetermined timbre, sound pattern, and voice message, the acoustic section 142 aurally provides or reports various information to the user US. The vibration section 143 has a vibration device (vibrator) such as a vibration motor or a vibrator. By generating vibration information such as a predetermined vibration pattern and its intensity, the vibration section 143 tactually provides or reports various information to the user US. The output interface section 140 may have a structure including, for example, at least one of the display section 141, the acoustic section 142, and the vibration section 143 described above. Note that the output interface section 140 preferably has a structure including at least one of the display section 141, the acoustic section 142, and the vibration section 143 for the case where specific information such as numerical value information is provided to the user US.

The communication function section 150 functions as an interface when sensor data obtained by the sensor section 110 and GPS data obtained by the GPS reception circuit 120 (hereinafter collectively referred to as "sensor data and the like") are transmitted to the information communication terminal 300 described below. The communication function section 150 also functions as an interface with the chest device 200, which will be described further below, when a synchronizing signal for the synchronization of time data associated with sensor data, heartbeat data, and the like obtained by the chest device 200 is transmitted. Moreover, the communication function section 150 may function as an interface when sensor data, heartbeat data, and the like obtained by the chest device 200 is received. Note that, as a method for transferring or transmitting and receiving sensor data, a synchronizing signal, and the like between the wrist device 100 and the information communication terminal 300 or the chest device 200 via the communication function section 150, various wireless communication methods and wired communication methods via a communication cable can be adopted.

In a case where the above-described sensor data and the like are transferred via a wireless communication method, for example, Bluetooth (registered trademark), which is short-range wireless communication standards for digital devices, Bluetooth (registered trademark) low energy (LE) developed as a low-power-consumption-type of the above-described communication standards, or a communication method equivalent thereto can be favorably adopted. By this wireless communication method being adopted, data transmission can be favorably performed even with small electric power generated by using an energy harvesting technology or the like as the operating power supply 190 described below.

The memory section 170 mainly has, for example, a sensor data storage memory (hereinafter referred to as a "sensor data memory") 171, a program storage memory (hereinafter referred to as a "program memory") 172, and a work data storage memory (hereinafter referred to as a "working memory") 173, as depicted in FIG. 3.

The sensor data memory 171 has a non-volatile memory such as a flash memory, and stores sensor data and the like obtained by the sensor section 110 and the GPS reception circuit 120 described above in association with each other in a predetermined storage area. The program memory 172 has a ROM (Read-Only Memory), and stores a control program for performing a predetermined operation in each section, such as a sensing operation in the sensor section 110 and the GPS reception circuit 120 and a data transfer operation in the communication function section 150. The working memory 173 has a RAM (Random Access Memory), and temporarily stores various data for use in executing the control program and various data generated thereby. The sensor data memory 171 may be partially or entirely a removable storage medium such as a memory card, and may be structured to be attachable to and removable from the wrist device 100.

The computation circuit 160, which is a computation device such as a CPU (Central Processing Unit) or a MPU (microprocessor), executes a predetermined control program stored in the program memory 172 based on an operation clock generated by the clock circuit 180 described below, and thereby controls various operations such as a sensing operation by the various sensors 111 to 113 of the sensor section 110 and the GPS reception circuit 120, an information providing operation by the output interface section 140, and a data transmission operation by the communication function section 150. The control program to be executed in the computation circuit 160 may be incorporated in advance in the computation circuit 160.

The clock circuit 180 has an oscillator that generates a base clock and, based on the base clock, generates an operation clock that defines the operation timing of each component of the wrist device 100, a synchronizing signal for synchronizing time data with the chest device 200 and the information communication terminal 300, time data that indicates a current time, and the like. Also, the clock circuit 180 clocks the timing of obtaining sensor data and the like in the sensor section 110 and the GPS reception circuit 120 and outputs time data thereof. The time data is associated with the obtained sensor data and the like and stored in the sensor data memory 171. Also, the time data is displayed on the display section 141 of the output interface section 140, whereby the current time and the like are provide to the user US.

The operating power supply 190 supplies driving electric power to each component inside the device body 101 of the wrist device 100. As the operating power supply 190, for example, a primary battery such as a commercially-available coin-shaped battery or button-shaped battery or a secondary battery such as a lithium-ion battery or a nickel-metal-hydride battery can be applied. In addition, it is possible to apply a power supply by an energy harvest technology for generating electricity by energy such as vibrations, light, heat or electro-magnetic waves. In a case where the wrist device 100 has a structure where sensor data and the like are transferred by a wired communication method to the information communication terminal 300, a configuration may be adopted in which, by the wrist device 100 being connected to the information communication terminal 300 via a communication cable, driving electric power is supplied from the information communication terminal 300 to charge the secondary battery of the operating power supply 190.

(Chest Device 200)

The chest device 200 is a chest-mount-type sensor device that is worn on the chest of the user US, as depicted in FIG. 2A and FIG. 2C. This chest device 200 mainly includes a device body 201 which detects the exercise status and the biological information of the user US and a band section 202 that is wound around the chest of the user US to mount the device body 201 on the chest.

Specifically, the chest device 200 mainly includes, for example, a sensor section 210, a heartbeat detection circuit 220, an operation switch 230, a communication function section 250, an computation circuit 260, a memory section 270, a clock circuit 280, and an operating power supply 290, as depicted in FIG. 4. Here, descriptions of components similar to those of the wrist device 100 are simplified.

As with the wrist device 100, the sensor section 210 is a motion sensor for detecting a motion of a human body (in particular, an exercise posture, a travelling direction, a stride, etc.) This sensor section 210 has, for example, a triaxial acceleration sensor 211, a triaxial angular velocity sensor 212, and a triaxial geomagnetic sensor 213, as depicted in FIG. 4. Sensor data obtained by detection by these various sensors 211 to 213 (acceleration data, angular velocity data, and geomagnetic data) is associated with time data defined by the clock circuit 280 described below, and stored in a predetermined storage area of a sensor data storage memory 271 of the memory section 270 described below.

The heartbeat detection circuit 220, which is provided on the inner surface side (human body side) of the belt section 202 of the chest device 200, is connected to an electrode (omitted in the drawing) placed in close direct contact with the chest of the user US, detects a change in electrocardiographic signals outputted from the electrode, and outputs the change as heartbeat data. As with the sensor data described above, the heartbeat data is associated with time data defined by the clock circuit 280 and stored in a predetermined storage area of the sensor data memory 271 of the memory section 270.

The operation switch 230 is an input interface having at least a power supply switch. By the operation switch 230 being operated by the user US, the status of supply (supply or interrupt) of driving electric power from the operating power supply 290 to each component is controlled so as to control ON/OFF of the power supply of the chest device 200. This operation switch 230 also has a sensor control key switch. By the operation switch 230 being operated by the user US, the start and stop of a sensing operation by the sensor section 210 and the heartbeat detection circuit 220 is controlled.

As with the wrist device 100, the communication function section 250 functions as an interface when sensor data obtained by the sensor section 210 and heartbeat data obtained by the heartbeat detection circuit 220 (sensor data and the like) are transmitted to the information communication terminal 300 and the wrist device 100 and when synchronization with the wrist device 100 is performed. Note that, as a method for transferring or transmitting and receiving sensor data, a synchronizing signal, and the like between the chest device 200 and the information communication terminal 300 or the wrist device 100 via the communication function section 250, various wireless communication methods and wired communication methods via a communication cable can be adopted, as in the case of the wrist device.

As with the wrist device 100, the memory section 270 mainly has a sensor data memory 271, a program memory 272, and a working memory 273. The sensor data memory 271 stores, in a predetermined storage area, sensor data and the like obtained by the sensor section 210 and the heartbeat detection circuit 220 in association with each other. The program memory 272 has stored therein a control program for performing a predetermined operation in each section, such as a sensing operation in the sensor section 210 and the heartbeat detection circuit 220 and a data transmitting operation in the communication function section 250. The working memory 273 temporarily stores various data for use in executing the control program and various data generated thereby. As with the wrist device 100, the sensor data memory 271 may be partially or entirely a removable storage medium, and may be structured to be attachable to and removable from the chest device 200.

As with the wrist device 100, the computation circuit 260 executes a predetermined control program stored in the program memory 272 based on an operation clock generated by the clock circuit 280 described below, and thereby controls various operations such as a sensing operation by the various sensors 211 to 213 of the sensor section 210 and the heartbeat detection circuit 220 and a data transmission operation by the communication function section 250. The control program to be executed in the computation circuit 260 may be incorporated in advance in the computation circuit 260.

The clock circuit 280 has an oscillator that generates a base clock and, based on the base clock, generates an operation clock that defines the operation timing of each component of the chest device 200. Also, the clock circuit 280 clocks the timing of obtaining sensor data and the like in the sensor section 210 and the heartbeat detection circuit 220 and outputs time data thereof. The time data is associated with the obtained sensor data and the like and stored in the sensor data memory 271. Then, based on a synchronizing signal transmitted from the wrist device 100, the synchronization of time data is performed between the chest device 200 and the wrist device 100. This synchronizing operation between the wrist device 100 and the chest device 200 may be performed in the wrist device 100 and the chest device 200 at, for example, activation timing at which the power supply is turned ON or at sensing operation start timing in the sensor sections 110 and 210. Also, it may be performed at predetermined time intervals, at arbitrary timing, or at all times.

The operating power supply 290 supplies driving electric power to each component inside the device body 201 of the chest device 200 by the operation switch 230 being operated. As the operating power supply 290, for example, a primary battery or a secondary battery can be applied. In addition, it is possible to apply a power supply by an energy harvest technology. In a case where the chest device 200 has a structure where sensor data and the like are transferred by a wired communication method to the information communication terminal 300, a configuration may be adopted in which, by the chest device 200 being connected to the information communication terminal 300 via a communication cable, driving electric power is supplied from the information communication terminal 300 to charge the secondary battery of the operating power supply 290.

(Information Communication Terminal 300)

The information communication terminal 300 has a function for connecting to a network 400 such as the Internet. As the information communication terminal 300, a network communication device having incorporated therein a web browser as viewing software, such as a notebook or desktop personal computer 301, a portable telephone 302, an advanced portable telephone (hereinafter referred to as a "smartphone") 303, a tablet terminal 304, or a dedicated terminal (omitted in the drawing) can be adopted, as depicted in FIG. 1. In particular, in a network communication device such as the portable telephone 302, the smartphone 303, or the tablet terminal 304, a function for connecting to the network 400 and a web browser have already been included, and therefore connection can be easily made to the network 400 anywhere within a prescribed communicable range.

Specifically, the information communication terminal 300 mainly includes, for example, an input operating section 330, a display section 340, a communication function section 350, a computation circuit 360, a memory section 370, a clock circuit 380, and an operating power supply 390, as depicted in FIG. 5. Here, descriptions of components similar to those of the wrist device 100 and the chest device 200 are simplified.

The input operating section 330 is an input means, such as a keyboard, a mouse, a touch pad, a dial key, or a touch panel, annexed to the personal computer 301, the portable telephone 302, the smartphone 303, the tablet terminal 304, etc. By selecting an arbitrary icon or menu displayed on the display section 340 or pointing an arbitrary area on the screen display by using the input operating section 330, a function corresponding to this icon, menu, or area is performed.

The display section 340 has, for example, a monitor or a display panel of a liquid-crystal-type or a light-emitting-element-type, and displays at least a communication status and a transfer condition when sensor data and the like obtained in the wrist device 100 and the chest device 200 are transferred to the network server 500 via the network 400 described below. In a case where the information communication terminal 300 is adopted as the user terminal 700 for viewing various exercise information analyzed and processed in the network server 500, sensor data and the like and various exercise information generated based on results of the analysis thereof are displayed on the display section 340 in the form of numerical values, a graph, a map, animation, or the like. Examples of this exercise information displayed on the display section of the user terminal 700 will be described in detail further below.

The communication function section 350 functions as an interface when sensor data and the like obtained in the wrist device 100 and the chest device 200 are transmitted to the network server 500 via the network 400 described below and when analysis data and the like obtained by analysis in the network server 500 is received. Also, this communication function section 350 functions as an interface when a synchronizing signal transmitted from the wrist device 100 for the synchronization of time data between the wrist device 100 and the chest device 200 is received. Note that, as a method for transferring or transmitting and receiving sensor data, a synchronizing signal, and the like between the information communication terminal 300 and the wrist device 100 or the chest device 200 via the communication function section 350 as described above, various wireless communication methods and wired communication methods can be adopted. Also, as a connection method between the information communication terminal 300 and the network 400 when sensor data and the like are transferred by the communication function section 350 to the network server 500, for example, a wired connection method for connection via an optical fiber line network or an ADSL (Asymmetric Digital Subscriber Line) network or a wireless connection method for connection via a portable telephone network or a high-speed mobile communication network can be adopted.

The memory section 370 mainly includes a sensor data memory 371, a program memory 372, and a working memory 373, as in the case of the wrist device 100 and the chest device 200. The sensor data memory 371 has a non-volatile memory for storing sensor data and the like transferred from the wrist device 100 and the chest device 200 in association with each other in a predetermined storage area. The program memory 372 has stored therein a control program for performing a predetermined operation in each section, such as a display operation in the display section 340 and a data transmitting operation in the communication function section 350. The working memory 373 temporarily stores various data for use in executing the control program and various data generated thereby. In a case where the information communication terminal 300 is used as a user terminal 700 for viewing exercise information analyzed and processed in the network server, a structure may be adopted in which the memory section 370 has an analysis data storage memory (omitted in the drawing) for storing analysis data and the like received via the network 400. Also, the sensor data memory 371 may be partially or entirely a removable storage medium, and may be structured to be attachable to and removable from the information communication terminal 300, as in the case of the wrist device 100 and the chest device 200.

The computation circuit 360 executes a predetermined control program stored in the program memory 372 based on a operation clock generated in the clock circuit 380, and thereby controls an operation in each section, such as a display operation in the display section 340 and a data transmitting operation in the communication function section 350. The control program to be executed in the computation circuit 360 may be incorporated in advance in the computation circuit 360.

The clock circuit 380 generates an operation clock that defines the operation timing of each component of the information communication terminal 300. Then, based on a synchronizing signal transmitted from the wrist device 100, the synchronization of time data is performed between the information communication terminal 300 and the wrist device 100 or the chest device 200.

The operating power supply 390 supplies driving electric power to each component of the information communication terminal 300. In a portable telephone or a smartphone, a secondary battery such as a lithium-ion battery is adopted as the operating power supply 390. In a notebook personal computer or tablet terminal, a secondary battery such as a lithium-ion battery or a commercial alternating-current power supply is adopted. In a desktop personal computer, a commercial alternating-current power supply is adopted.

(Network 400)

As the network 400, a computer network where sensor data and the like and exercise information can be transmitted and received between the information communication terminal 300 and the network server 500 can be adopted. Here, the network 400 may be a publicly-usable network such as the Internet or a network that is limitedly usable by a business enterprise, a university, or an organization specific to an area or the like.

(Network Server 500)

The network server 500 is an application server having at least a function for analyzing and processing data, which will be described further below. As depicted in FIG. 1, the network server 500 analyzes and processes sensor data and the like transferred from the information communication terminal 300 via the network 400 so as to generate various exercise information regarding the exercise status of the user US. This network server 500 internally or externally includes a memory and a database for storing and accumulating sensor data and the like transferred from the information communication terminal 300, various data to be referred to in analysis and conversion processing, and the generated analysis data and specific information. Note that a computer network constituted by the network 400 and the network server 500 may use, for example, a commercial Internet cloud service or the like.

Specifically, the network server 500 includes, for example, an input operation section 530, a display section 540, a communication function section 550, a computation circuit 560, a memory section 570, a clock circuit 580, an operating power supply 590, and a database 600, as depicted in FIG. 6. Here, descriptions of components similar to those of the wrist device 100, the chest device 200, and the information communication terminal 300 are simplified.

The input operation section 530, which includes an input device such as a keyboard, or a mouse, is used to select an arbitrary icon or menu displayed on the display section 540 or to point an arbitrary area. The display section 540 has a monitor or a display panel, and displays information regarding various operations in the network server 500.

The communication function section 550 functions as an interface when sensor data and the like transferred from the information communication terminal 300 are received and when analysis data and the like obtained by analysis in the network server 500 are transmitted to the user terminal 700 (or the information communication terminal 300 or another network communication device).

The memory section 570 includes a transfer data memory 571, a program memory 572, and a working memory 573. The transfer data memory 571 stores sensor data and the like (transfer data) transferred from the information communication terminal 300. The program memory 572 stores a control program for performing a predetermined operation in the display section 540 and the communication function section 550 and an algorithm program for performing predetermined analysis and conversion processing based on transferred sensor data and the like. The working memory 573 temporarily stores various data for use in executing the control program and the algorithm program and various data generated thereby. The database 600 stores and accumulates various exercise information regarding the exercise status of the user US generated by analyzing and processing sensor data and the like in the computation circuit 560. It also stores and accumulates various data to be referred to in the analysis and conversion processing. The database 600 may be incorporated in the network server 500, externally provided to the network server 500, or directly connected to the network 400.

The computation circuit 560 executes the predetermined algorithm program stored in the program memory 572 based on an operating clock generated at the clock circuit 580, and thereby performs predetermined analysis and conversion processing based on sensor data and the like stored in the transfer data memory 571. In particular, in the present embodiment, the computation circuit 560 performs processing for generating form data indicating the posture of the user US during exercise for each analysis item based on results of analyzing sensor data and the like. As a result, various exercise information regarding the exercise status of the user US are generated in the computation circuit 560, and stored in a predetermined storage area of the database 600. Also, by the user US accessing the network server 500 by using the user terminal 700, the computation circuit 560 reads out exercise information in accordance with the user's request from the database 600 as necessary, and generates web display data for displaying it on the user terminal 700 in a display format using numerical values, a graph, map, animation, or the like. Note that the control program and the algorithm program to be executed in the computation circuit 560 may be incorporated in advance in the computation circuit 560. Also, as the operating power supply 590, a commercial alternating-current power supply is adopted.

(User Terminal 700)

The user terminal 700 is a network communication device having a structure similar to that of the information communication terminal 300. By the user US accessing the network server 500, the user terminal 700 receives web display data including exercise information and the like generated in the network server 500 via the network 400, and displays it by a web browser. As a result of this configuration, the user US can view various exercise information based on sensor data and the like detected during an exercise such as running, in a display format where these pieces of various information are singly displayed or a display format where they are displayed by being linked to each other, and thereby can analyze his or her own exercise status and reflect the analysis results in the improvement of an exercise method thereafter. Note that, as the user terminal 700, the information communication terminal 300 used for transferring sensor data and the like to the network server 500 may be directly applied, or a network communication device different from the information communication terminal 300 may be applied. In the latter structure, sensor data and the like are transferred to the network server 500 by using, for example, the portable telephone 302 or the smartphone 303, and the network server 500 is accessed by using, for example, the personal computer 301 or the tablet terminal 304 for viewing exercise information and the like.

(Exercise Information Display Method)

Next, a control method in the exercise information display system according to the present embodiment (the exercise information display method) is described with reference to the drawings.

Figure 7:
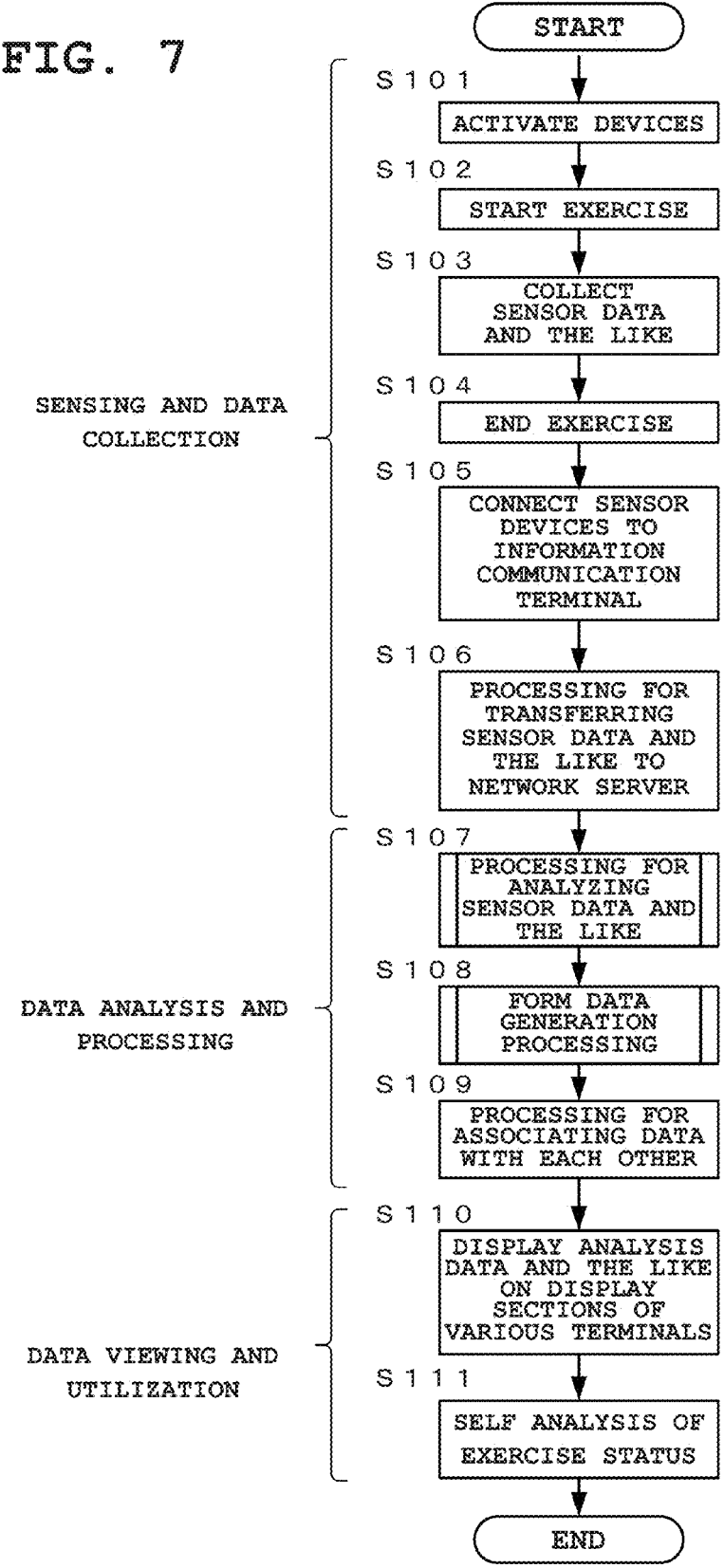
FIG. 7 is a flowchart of an example of an exercise information display method in the exercise information display system according to the embodiment.

FIG. 7 is a flowchart of an example of the exercise information display method in the exercise information display system according to the present embodiment.

In the exercise information display method according to the present embodiment, mainly, a sensing and data collection procedure, a data analysis and processing procedure, and a data viewing and utilizing procedure are sequentially performed, as depicted in the flowchart of FIG. 7.

In the sensing and data collection procedure, as depicted in FIG. 7, the user US first operates the power supply switch of each of the wrist device 100 and the chest device 200 worn on the body to activate the wrist device 100 and the chest device 200 (Step S101). Next, by the user US operating the input interface section 130 of the wrist device 100 and the operation switch 230 of the chest device 200 simultaneously with or before or after the start of an exercise, the computation circuits 160 and 260 starts a sensing operation in the wrist device 100 and the chest device 200, respectively, (Step S102). This sensing operation continues until the user US operates the input interface section 130 of the wrist device 100 and the operation switch 230 of the chest device 200 to end this operation simultaneously with or before or after the end of the exercise (Step S104). As a result, sensor data and the like indicating the movement status and the biological information of the user US during the exercise are collected (Step S103).

Specifically, in the wrist device 100 worn on a wrist of the user US, sensor data including acceleration data, angular velocity data, and geomagnetic data during the exercise such as running are detected by the sensor section 110, and GPS data including position data and movement speed data are detected by the GPS reception circuit 120, as depicted in FIG. 2A and FIG. 3. These detected data are each associated with time data and stored in the sensor data memory 171. Also, in the chest device 200 worn on the chest of the user US, sensor data including acceleration data, angular velocity data, and geomagnetic data during the exercise are detected by the sensor section 210, and heartbeat data is detected by the heartbeat detection circuit 220, as depicted in FIG. 2A and FIG. 4. These detected data are each associated with time data and stored in the sensor data memory 271. Furthermore, for example, in the wrist device 100, the movement speed (pace) is calculated by the computation circuit 160 based on the time data and the position data. Also, for example, in the chest device 200, a calorie consumption amount is calculated by the computation circuit 260 based on the time data, the heartbeat data, the weight and age of the user US, etc. These calculated data are each associated with time data and stored in the sensor data memories 171 and 271. Then, the sensor data, the GPS data, and the heartbeat data collected during the exercise, or the various information (the movement speed, the calorie consumption amount, etc.) calculated based on the sensor data and the like are provided to the user US by, for example, being displayed on the display section 141 of the wrist device 100 in real time. Note that sensor data and heartbeat data obtained by the chest device 200 are transmitted to the wrist device 100 continuously or at predetermined time intervals by, for example, a wireless communication method such as Bluetooth (registered trademark) via the communication function section 250, and displayed on the display section 141.

Next, the wrist device 100 and the chest device 200 are connected to the information communication terminal 300 by a wireless communication method such as Bluetooth (registered trademark), or a wired communication method via a communication cable (Step S105). As a result, the sensor data and the like stored in the sensor data memories 171 and 271 are transmitted to the information communication terminal 300 by the communication function sections 150 and 250 of the wrist device 100 and the chest device 200, temporarily stored in the sensor data memory 371, and then transferred to the network server 500 via the network 400 by the communication function section 350 of the information communication terminal 300 (Step S106). The sensor data and the like (transfer data) transferred by the information communication terminal 300 via the network 400 to the network server 500 are stored in a predetermined storage area of the transfer data memory 571 of the memory section 570.

In the data analysis and processing procedure, firstly, the computation circuit 560 of the network server 500 performs predetermined analysis and processing based on the transfer data stored in the transfer data memory 571 to generate various exercise information including form data indicating the exercise posture of the user US, as depicted in FIG. 7.

Specifically, various items indicating the exercise status of the user US are analyzed based on the sensor data and the like included in the transfer data (Step S107). As a result, for example, changes in the heart rate and the calorie consumption amount, the movement route, altitude changes during the exercise are analyzed, and these analysis results are processed such that changes and displacements of numerical values with time and distance are graphed or mapped based on the time data and distance data associated with the time data. Also, as various items indicating the exercise status of the user US, the pitch and stride, the wobble and variability of the body trunk, ground reaction force, grounding time, arm swing, spring model, and the like during the excise are analyzed based on the sensor data and the like. Based on these analysis results, form data indicating the exercise posture of the user US is generated (Step S108). Here, the form data indicating the exercise posture of the user US is processed to be, for example, animation (skeleton animation or stick picture animation) by a skeleton model reflecting the temporal change of the exercise posture.

Then, the form data is associated with map data indicating the movement route during the exercise, a graph representing the time variation of the sensor data and the like, etc., and stored in a predetermined storage area of the database 600 (Step S109). Note that the processing for analyzing sensor data and the like and the processing for generating form data will be described in detail further below.

In the data viewing and utilizing procedure, firstly, the user US operates the information communication terminal 300 or the user terminal 700 to access the network server 500 via the network 400, as depicted in FIG. 7. As a result, the network server 500 reads out various exercise information stored by the computation circuit 560 in the database 600 and processes the read information so as to convert it to web display data with a predetermined display format. The generated web display data is transmitted from the communication function section 550 to the information communication terminal 300 and the user terminal 700 via the network 400, and displayed on the display sections in the information communication terminal 300 and the user terminal 700 by using a web browser (Step S110). The user US views the exercise information such as a map, graph, and skeleton animation displayed on the display sections of the information communication terminal 300 and the user terminal 700 in the display format where these pieces of information are singly displayed or the display format where they are displayed by being linked to each other, and thereby can visually grasp the posture and the like during the exercise, perform self analysis (Step S111), and reflect the analysis results in the improvement of an exercise method thereafter. Display examples of the exercise information such as a map, graph, and skeleton animation will be described in detail further below.

(Processing for Analyzing Sensor Data and the Like)

Next, a specific example of the processing for analyzing sensor data and the like applied in the exercise information display method according to the present embodiment (Step S107) is described with reference to the drawings.

Figure 8:
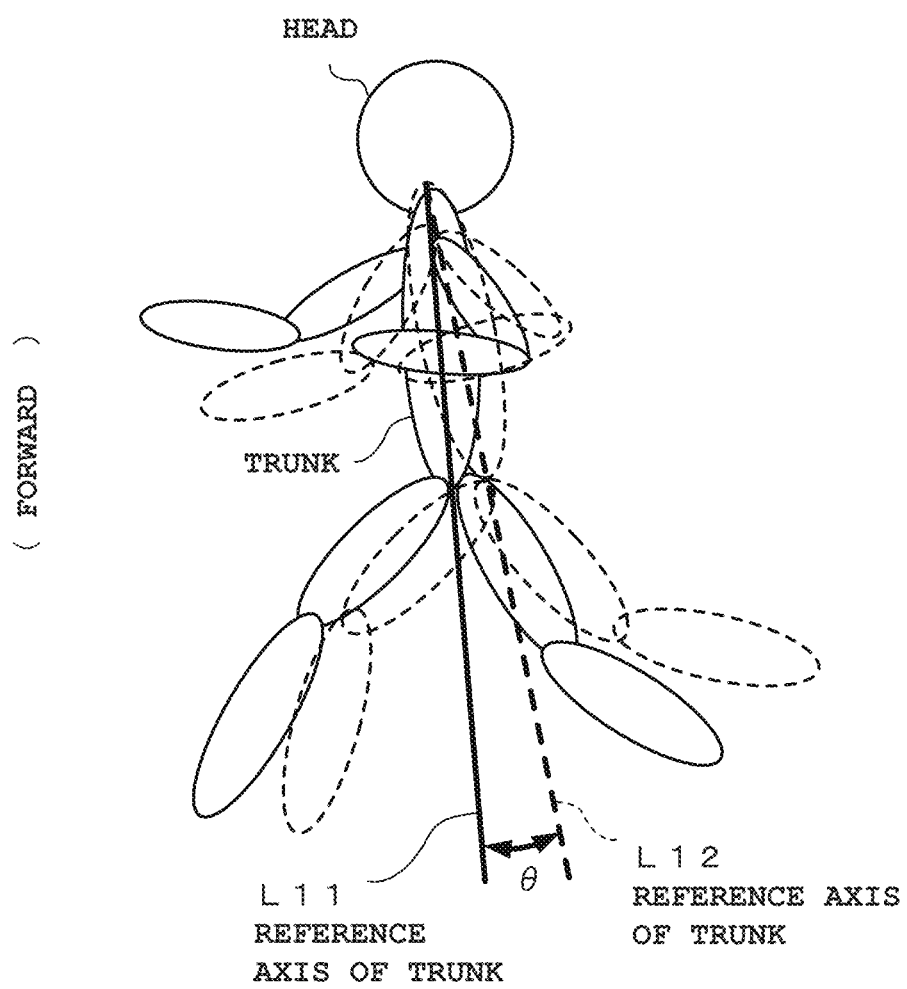
FIG. 8 is a conceptual diagram showing the wobble of a body trunk in processing for analyzing sensor data and the like according to the embodiment.
Figure 9:
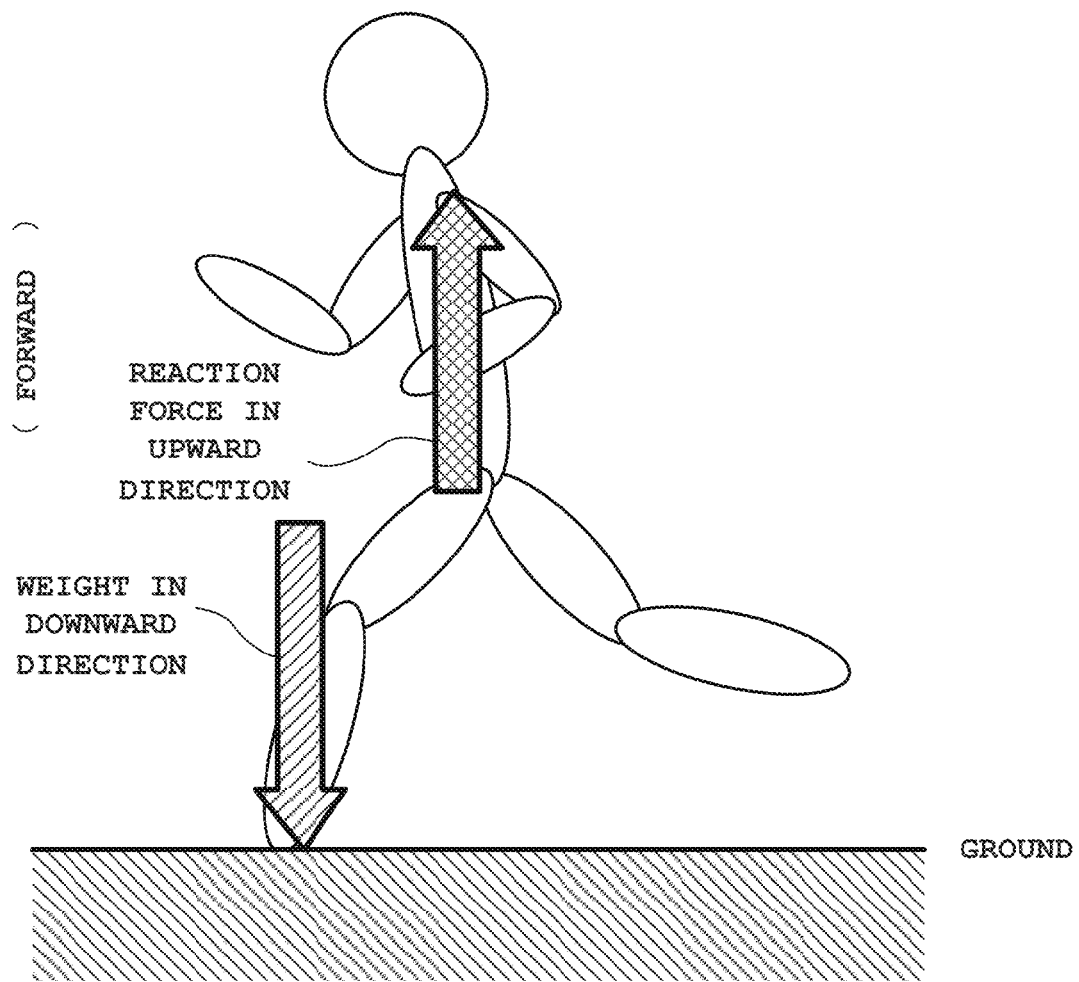
FIG. 9 is a conceptual diagram showing ground reaction force in the processing for analyzing sensor data and the like according to the embodiment.
Figure 10:
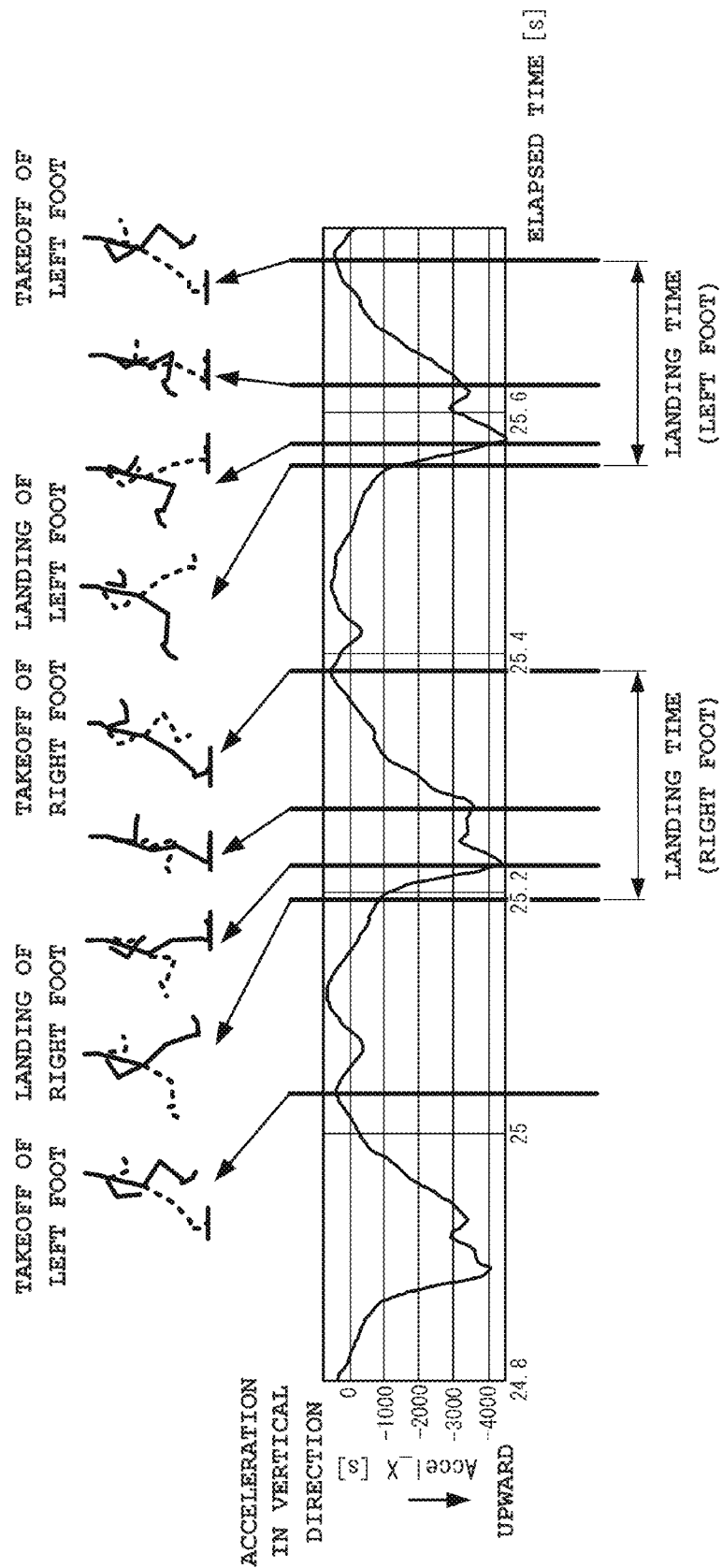
FIG. 10 is a conceptual diagram showing a foot landing time in the processing for analyzing sensor data and the like according to the embodiment.
Figure 11:
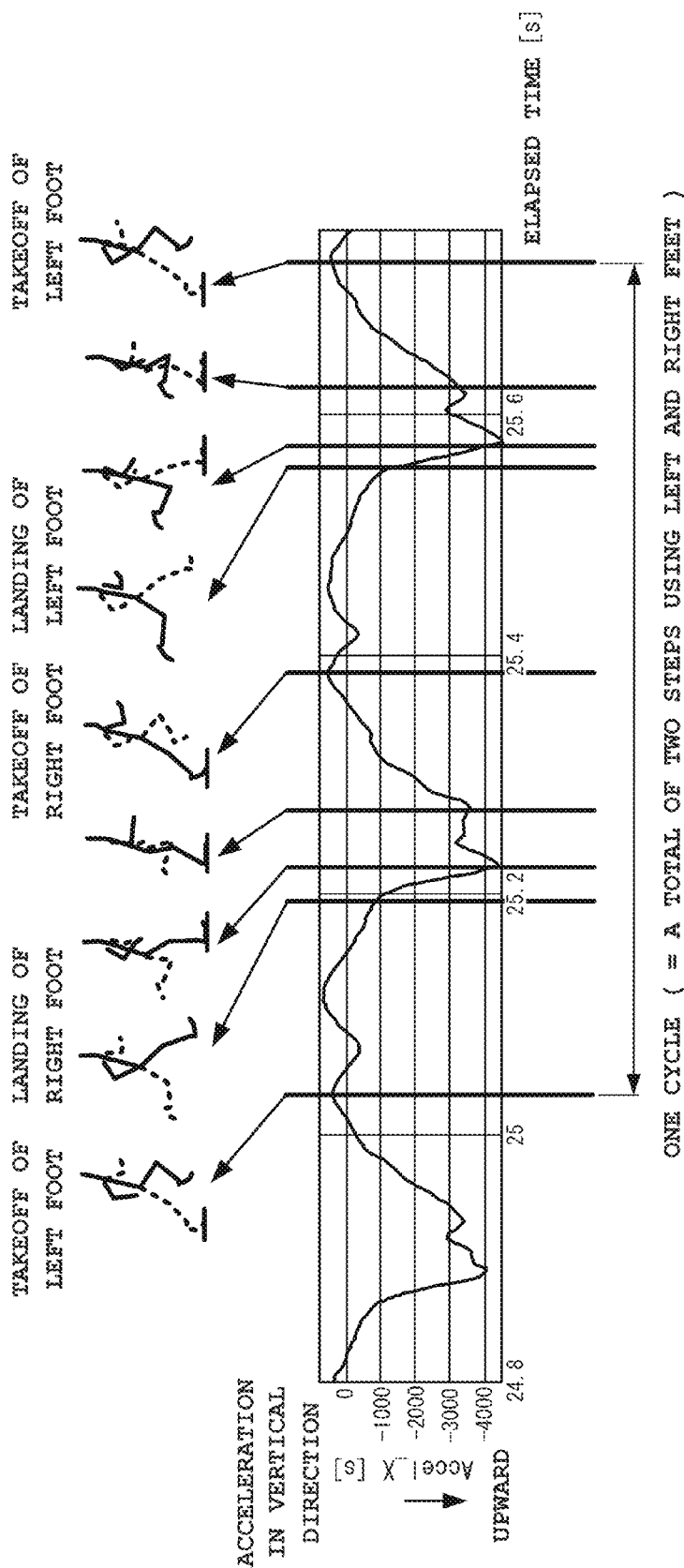
FIG. 11 is a conceptual diagram showing a running cycle in the processing for analyzing sensor data and the like according to the embodiment.
Figure 12:
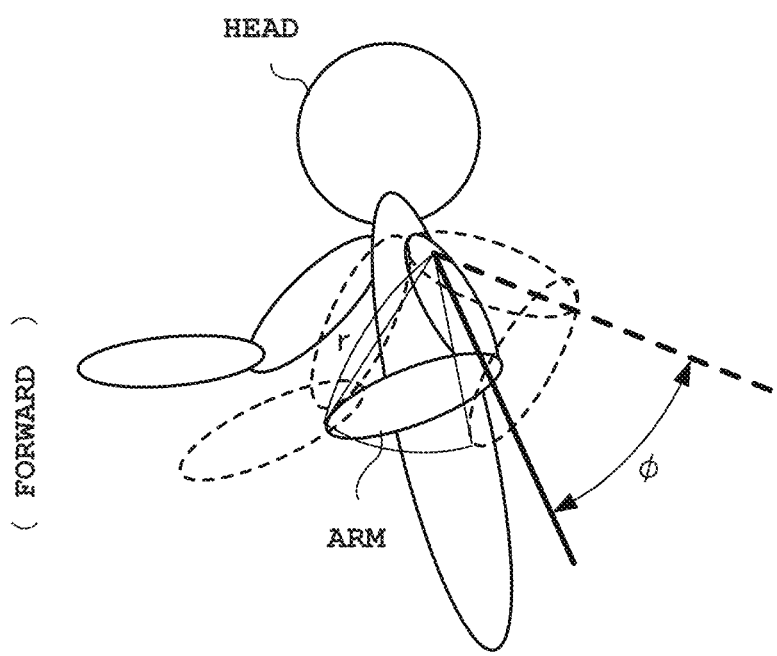
FIG. 12 is a conceptual diagram showing the swing of an arm in the processing for analyzing sensor data and the like according to the embodiment.

FIG. 8 is a conceptual diagram showing the wobble of a body trunk in the processing for analyzing sensor data and the like according to the present embodiment, and FIG. 9 is a conceptual diagram showing ground reaction force in the processing for analyzing sensor data and the like according to the present embodiment. FIG. 10 is a conceptual diagram showing a foot landing time in the processing for analyzing sensor data and the like according to the present embodiment, and FIG. 11 is a conceptual diagram showing a running cycle in the processing for analyzing sensor data and the like according to the present embodiment. FIG. 12 is a conceptual diagram showing the swing of an arm in the processing for analyzing sensor data and the like according to the present embodiment.

In the present embodiment, based on sensor data and the like obtained by the wrist device 100 and the chest device 200, various items described below indicating the exercise status of the user US are analyzed. Here, analysis items when the user US conducts running (a running motion) are described.

For example, based on the data of acceleration in triaxial directions detected by the triaxial acceleration sensor 211 provided to the chest device 200, information regarding the pitch, ground reaction force, wobble and variability of the body trunk, grounding time, and the like of the user US during running are obtained. Also, for example, based on the data of acceleration in triaxial directions detected by the triaxial acceleration sensor 211 provided to the chest device 200 and GPS data detected by the GPS reception circuit 120 provided to the wrist device 100, information regarding the stride of the user US during running is obtained. Moreover, for example, based on the data of acceleration in triaxial directions detected by the triaxial acceleration sensor 111 provided to the wrist device 100 and the data of angular velocities in the triaxial directions detected by the triaxial angular velocity sensor 112, information regarding the arm swing of the user US during running is obtained.

These analysis items each indicate a component of the exercise posture (running form) of the user US during running. That is, by analyzing and processing sensor data and the like obtained by the wrist device 100 and the chest device 200 and converting each analysis item into numerical values, the exercise posture of the user US during running can be relatively accurately reproduced for each analysis item.

Specifically, in the analysis of a pitch during running, based on the data of acceleration in triaxial directions obtained by the chest device 200, for example, a footstep count per minute (unit: bpm) is measured. If the numerical value of the pitch is within an optimum or favorable range, it is judged that the current pace (running speed) can be kept.

In the analysis of a stride during running, based on the data of acceleration in triaxial directions obtained by the chest device 200 and GPS data obtained by the wrist device 100, a step width at predetermined timing (unit: cm) is measured. If the numerical value of the stride is within an optimum or favorable range, it is judged that the current pace can be kept. Here, in general, a stride is shortened as fatigue is accumulated during running, and therefore the pace is likely to be kept by increasing the pitch. For this reason, the exercise status is judged in association with the above-described pitch.

In the analysis of the wobble of a body trunk during running, based on the data of acceleration in triaxial directions obtained by the chest device 200, the changes (a maximum value and a minimum value) of the angle of a reference axis of a body trunk within a specific time (for example, one cycle; refer to FIG. 11 described below) in each of forward, rearward, leftward, rightward, upward, and downward directions are calculated. Note that the body trunk herein indicates the center of a body, which is the main portion of the body excluding the four limbs. In the present embodiment, as the wobble of a body trunk, a difference between a reference axis L11 and a reference axis L12 is calculated as an angle θ, as depicted in FIG. 8. The reference axis L11 is an axis when the angle of the reference axis of a body trunk is minimum in each of the forward, rearward, leftward, rightward, upward, and downward directions of the body (body trunk) in a state where the head position has been fixed, and the reference axis L12 is an axis when the angle of the reference axis of the body trunk is maximum. In FIG. 8, only the wobble in the forward and rearward directions of the body trunk is conceptually depicted. If the numerical value of the wobble of the body trunk is small or within a predetermined range, it is judged that efficient running can be performed.

In the analysis of ground reaction force during running, based on the data of acceleration in triaxial directions obtained by the chest device 200, an upward reaction force that is received from the ground when the user steps on the ground (unit: N, sec, or N/sec) is calculated. The ground reaction force herein is an upward (upward direction in the drawing) reaction force from the ground which is received by a sole by the action-reaction law of force when weight is added to the ground in a downward direction (downward direction in the drawing) by the user stepping on the ground, as depicted in FIG. 9. It is known that, by using this ground reaction force, driving force in a forward direction (leftward direction in the drawing), which is a running direction, is obtained during running. It is also known that the ground reaction force is proportional to weight downwardly added to the ground. In the present embodiment, weight in a downward direction is measured by observing components in upward and downward directions in the data of acceleration in triaxial directions detected by the triaxial acceleration sensor 211, whereby a ground reaction force is calculated. If the numerical value of the ground reaction force is large or equal to or larger than a predetermined value, it is judged that efficient and strong running can be performed.

In the analysis of a foot landing time during running, based on the data of acceleration in triaxial directions obtained by the chest device 200, a time from foot landing to takeoff (unit: msec or %) is calculated. In the present embodiment, the landing time of the right foot and the landing time of the left foot are individually calculated by observing components in upward and downward directions in the data of acceleration in triaxial directions detected by the triaxial acceleration sensor 211, as depicted in FIG. 10. When the numerical value of this landing time is small or equal to or smaller than a predetermined value, it is judged that quick running can be performed.

In the analysis of the variability of a body trunk during running, based on the data of acceleration in triaxial directions obtained by the chest device 200, the variability of the tilt of the body trunk in each of the forward, rearward, leftward, and rightward directions is calculated. Here, in a running motion such as running, two steps of left and right legs from when a step of one foot is taken (takeoff of the left foot in the drawing) until when another step of the same foot is taken after a step of the other foot is taken (takeoff of the right foot) can be taken as one cycle (running cycle), as depicted in FIG. 11. In the present embodiment, as the variability of a body trunk, variability in average values of the tilt of the reference axis of the body trunk each calculated for each cycle in a plurality of different cycles is calculated as an angle θs. When the numerical value of this variability of the body trunk is small or within a predetermined range, it is judged that running with a stable posture can be performed.

In the analysis of an arm swing during running, based on the data of acceleration and angular velocities in triaxial directions obtained by the wrist device 100, the angle of the arm swing is measured. In the present embodiment, as the parameters of an arm swing, for example, an angle φ of an arm formed by fully swinging the arm (for example, the left arm) wearing the wrist device 100 forward and then fully pulling the arm back, and a length r from the supporting point of the arm swing to the tip of the arm are measured, as depicted in FIG. 12. When the numerical values of the arm swing are large or equal to or larger than a predetermined value, it is judged that efficient and strong running can be performed.

(Form Data Generation Processing)

Next, a specific example of the form data generation processing (Step S108) applied in the exercise information display method according to the present embodiment is described with reference to the drawings. Note that, in the processing described herein, skeleton animation which reproduces the exercise posture of the user US during running is generated as form data.

Figure 13:
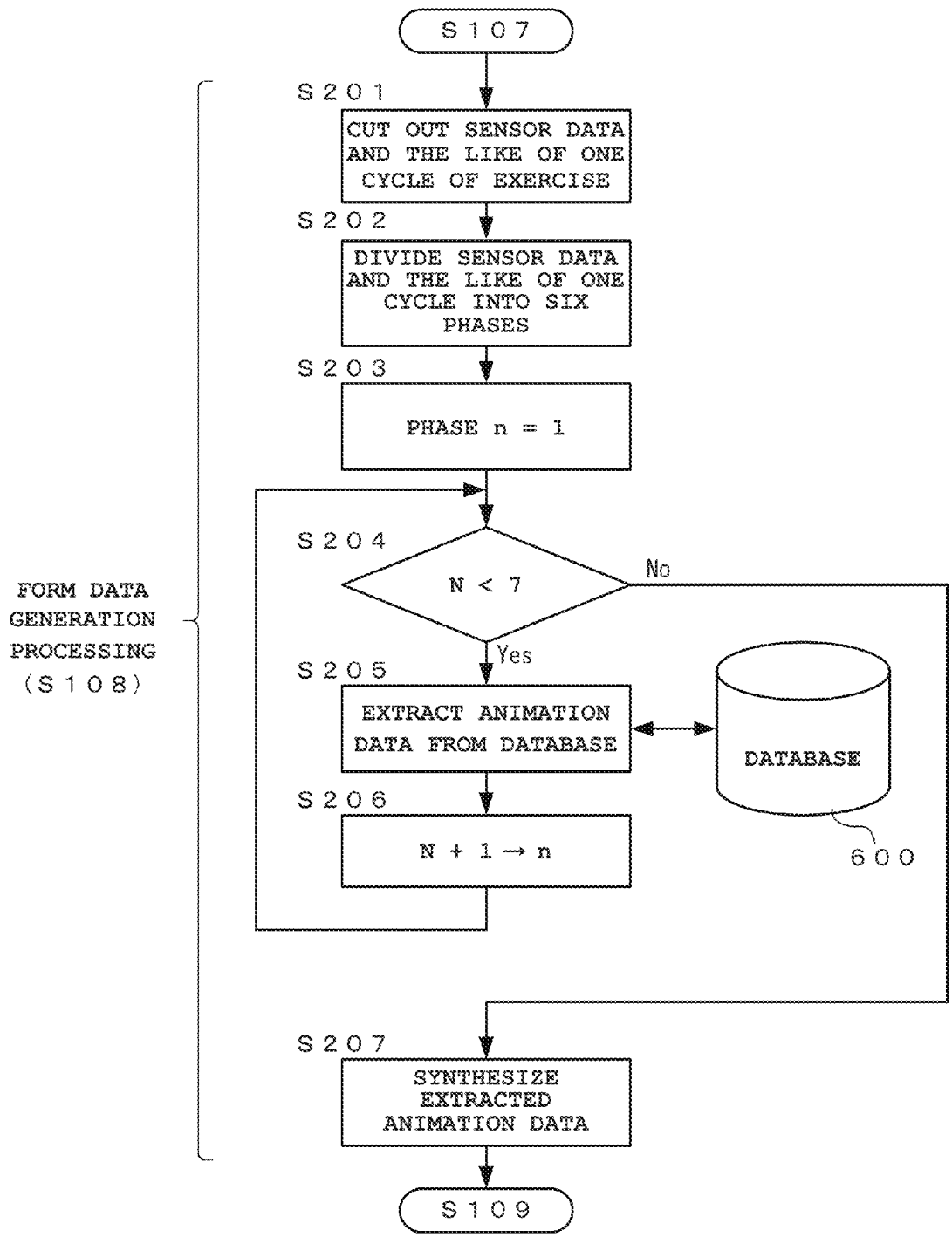
FIG. 13 is a flowchart of an example of skeleton animation generation processing applied in the exercise information display method according to the embodiment.
Figure 14:
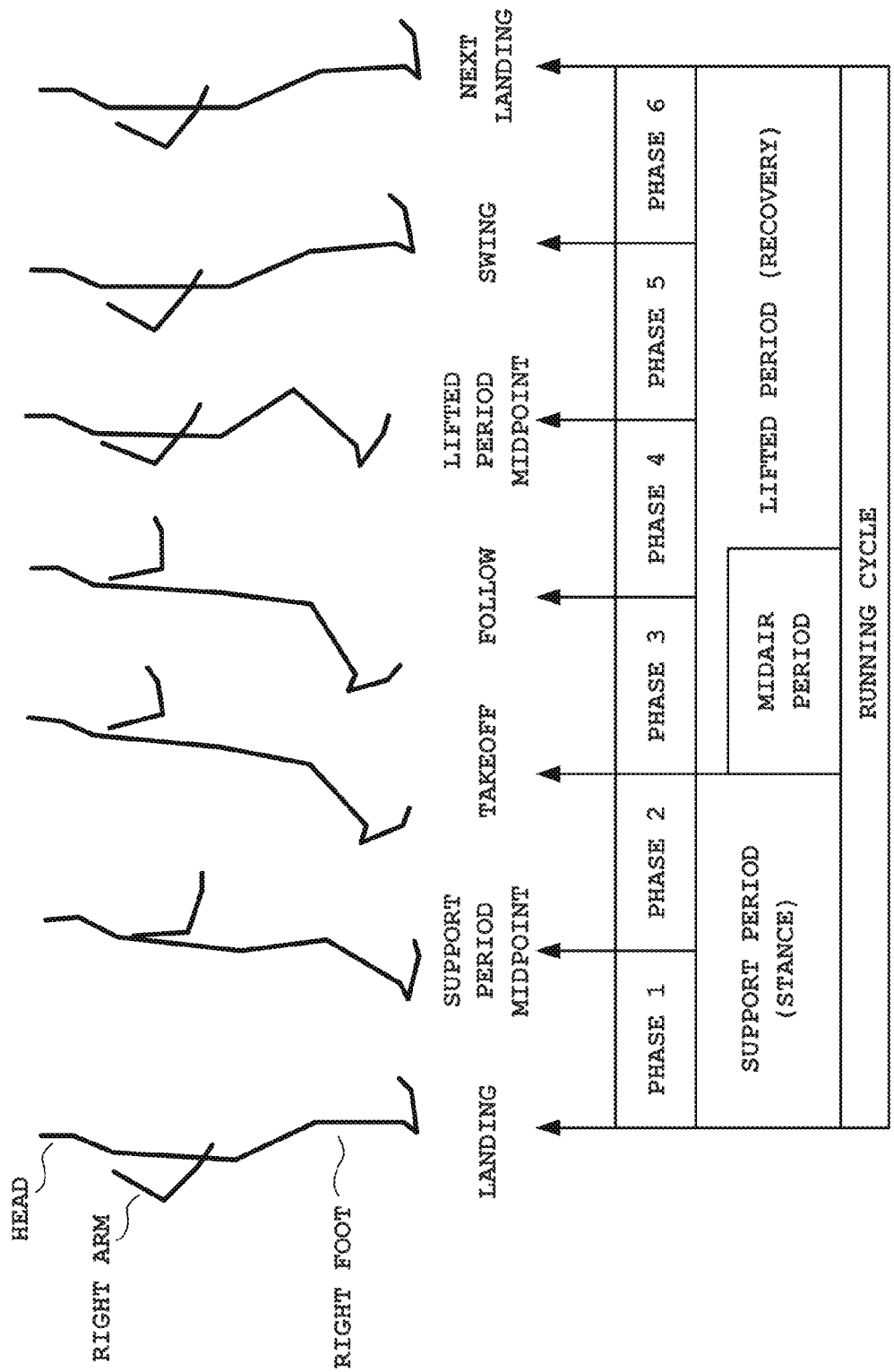
FIG. 14 is a descriptive diagram showing the concept of motion elements applied in the skeleton animation generation processing according to the embodiment.

FIG. 13 is a flowchart of an example of the skeleton animation generation processing applied in the exercise information display method according to the present embodiment, and FIG. 14 is a descriptive diagram showing the concept of motion elements applied in the skeleton animation generation processing according to the present embodiment.

In the skeleton animation generation processing applied in the present embodiment, at Step S106 described above, the computation circuit 560 first performs processing for cutting out sensor data and the like obtained by the wrist device 100 and the chest device 200 and transferred to the network server 500 via the information communication terminal 300 for each motion of one cycle of the exercise performed by the user US, as depicted in FIG. 13 (Step S201). Specifically, as depicted in FIG. 11 described above, the motion for one cycle in running or the like can be defined as a series of motions in which the right foot and the left foot each move only once (for example, landing of the right foot→landing of the left foot→landing of the right foot). Based on this series of motions, the computation circuit 560 of the network server 500 performs processing for sectioning the sensor data and the like stored in the transfer data memory 571 for each cycle.

Next, the computation circuit 560 performs processing for dividing the cut-out sensor data and the like for one cycle by the number of the motion elements of the exercise (Step S202). Specifically, the motion for one cycle in the case of running is mainly constituted by a series of motion elements formed of six phases including, for example, a phase 1 indicating a "landing" status of the right foot, a phase 2 indicating a "support period midpoint" status by the right foot, a phase 3 indicating a "takeoff" status of the right foot, a phase 4 indicating a "follow" status after rearward kicking of the right foot, a phase 5 indicating a "lifted period midpoint" status of the right foot, and a phase 6 indicating a "swing" status of the right foot swinging forward, as depicted in the skeleton model of FIG. 14. Here, the phases 1 and 2 can be defined as a "support period (stance)" by the right foot and the phases 3 to 6 can be defined as a "lifted period (recovery)" as depicted in FIG. 14. That is, at the time of running, with a period including the series of motion elements formed of the phases 1 to 6 as one cycle (running cycle), this series of motion elements is repeatedly performed. In the present embodiment, the sensor data and the like for one cycle cut out at Step S201 is further divided into six such that they correspond to the respective phases 1 to 6 each indicating the running motion as described above.

Next, the computation circuit 560 performs the above-described analysis processing (Step S107) on the sensor data and the like of each phase obtained by the division into six, and extracts unit image data of skeleton animation from the database 600 based on the analysis results for each analysis item (Step S205). Specifically, in the database 600, many pieces of unit image data of skeleton animation have been stored in advance, corresponding to features included in the analysis results obtained by the above-described analysis processing for each analysis item. Here, the unit image data of skeleton animation may be still images or moving images for a short period of time. By referring to this database 600 for each sensor data and the like obtained by the division based on the analysis results for each analysis item, the computation circuit 560 extracts unit image data corresponding to an analysis result having a matching or similar feature from among many pieces of unit image data of skeleton animation stored in advance. The extracted unit image data is temporarily stored in the working memory 573 in association with the sensor data and the like for each phase and other exercise information. Here, at Step S205, the computation circuit 560 repeatedly performs an operation of extracting unit image data of skeleton animation corresponding to the above-described analysis result for each of the phases 1 to 6 while sequentially incrementing a variable n, which specifies a phase, by 1 from 1 (n−1), until the variable n is 6 (Step S203 to Step S206).

Next, the computation circuit 560 synthesizes, in a time series manner, the unit image data extracted based on the analysis results for each phase obtained by the division into six, and thereby generates a series of skeleton animations (moving images) representing a running motion (Step S207). As a result, based on the sensor data and the like obtained during the running, skeleton animation reflecting the actual exercise posture of the user US (such as the pitch, the stride, the wobble of the body trunk, and the arm swing) is generated for the motion of running for one cycle.

Then, at Step S109 described above, the form data indicating the exercise posture of the user US reproduced by the skeleton animation is associated with other exercise information such as map data indicating the movement route during the exercise and the sensor data and the like made into a graph based on the movement distance and the elapsed time, and stored in a predetermined storage area of the database 600.

(Display Examples of Exercise Information)

Next, display examples of the exercise information applied in the exercise information display method according to the present embodiment are described with reference to the drawings. Here, display examples of exercise information when the user US performs running are described.

Figure 15:
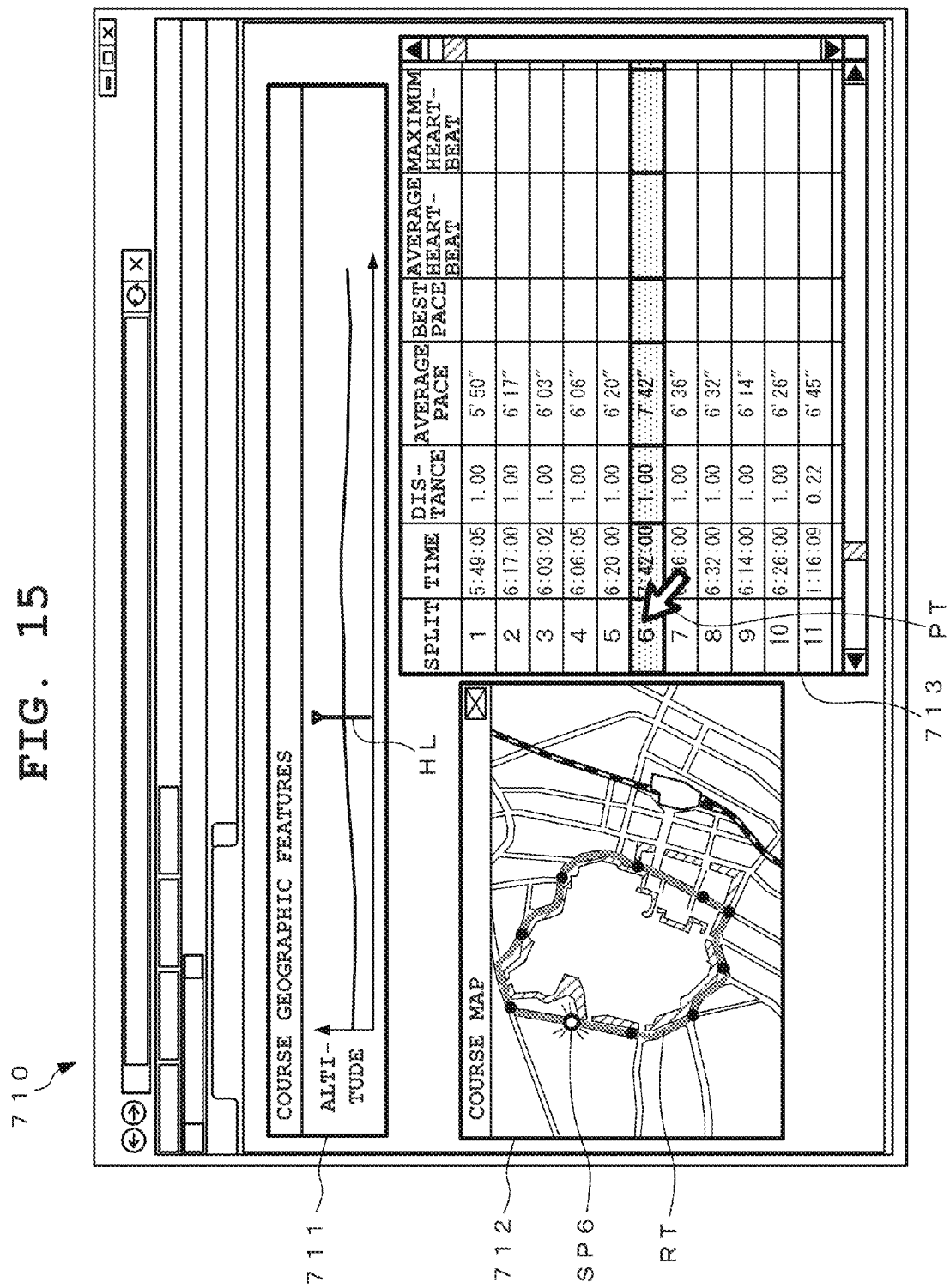
FIG. 15 is a schematic view showing a first display example of exercise information displayed on a user terminal or the like applied in the exercise information display system according to the embodiment.

FIG. 15 is a schematic view showing a first display example of the exercise information displayed on the user terminal or the like applied in the exercise information display system according to the embodiment. FIG. 16 to FIG. 21 are schematic views showing a second display example of the exercise information displayed on the user terminal or the like applied in the exercise information display system according to the embodiment.

At Step S110, by the user US operating the information communication terminal 300 or the user terminal 700 (hereinafter abbreviated as the "user terminal 700 or the like") to access the network server 500, the various exercise information generated in the data analysis and processing procedure and stored in the database 600 are displayed in a display format depicted in one of the following display examples, according to a desired analysis item. Here, as described above, since the user terminal 700 or the like has a function for connecting to the network 400, and has incorporated therein a web browser serving as viewing software, exercise information generated as web display data in the network server 500 can be displayed on a web screen.

(First Display Example)

In the first display example of the exercise information according to the present embodiment, for example, a graph 711 representing changes in the altitude of a movement route (running course) RT where the user US has run is displayed in the upper area of a web screen 710 displayed on the display section of the user terminal 700 or the like, map information 712 representing the running course RT of the user US is displayed on the left in the lower area, and a table 713 where various exercise information based on sensor data and the like obtained during an exercise and their analysis results are represented by numerical values is displayed on the right in the lower area, as depicted in FIG. 15. Note that the web screen 710 depicted in FIG. 15 is merely an example applicable in the present invention, and the type of exercise information to be displayed, the number of display information, the display position thereof, and the like may be arbitrarily set.

In the map information 712, the running course RT is displayed by being superimposed on map data available on the network 400 such as the Internet. In the graph 711 representing altitude changes, distance changes or time changes regarding altitude are displayed in a form of a line graph, in conjunction with a point on the running course RT displayed on the map information 712 and time data. Here, as the map data and the altitude data, for example, map data and altitude data available on the Internet such as Google Maps map service (registered trademark) provided by Google (registered trademark) on the Internet may be used. Alternatively, map data and altitude data commercially available in a form of, for example, a map disk may be captured into the network server 500 and the database 600 for use.

In the table 713, numerical values of various sensor data and the like (such as a pace, a heart rate, and a required time) obtained by the wrist device 100 and the chest device 200 during running and various exercise information (such as the wobble and variability of a body trunk, ground reaction force, and a foot landing time) generated based on analysis results are displayed for each split section obtained by sectioning the running course RT into a predetermined distance (for example, 1 km).

With the first display example of the exercise information described above, the user US can grasp his or her exercise status at the time of running by performing the following operations. Firstly, on the table 713 displayed on the web screen 710, the user US performs a specifying operation (for example, a click operation) on an arbitrary split section ("split" in the drawing) by a mouse pointer PT, a touch panel, or the like, as depicted in FIG. 15. By this operation, the exercise information of the split section (split section "6" in the drawing) is provided from the network server 500, a marker SP 6 indicating that split section is displayed on the running course RT of the map information 712, and a line HL indicating that split section is displayed on the graph 711 representing the altitude. The exercise information of the split section specified in the table 713 is preferably displayed by highlight display or intensified display so that it can be easily viewed by the user, as depicted in FIG. 15.

(Second Display Example)

Also, with the first display example described above, the user US can grasp his or her exercise status at the time of running in further detail by performing the following operations. That is, on the table 713 depicted in FIG. 15, the user US selects an arbitrary split section with the mouse pointer PT, the touch panel, or the like to perform a specifying operation (for example, a double-click operation) for display of detailed information. By this operation, web display data including various exercise information for display of detailed information is provided from the network server 500. For example, a graph representing the time variation of sensor data and the like, skeleton animation reflecting temporal changes in the exercise posture are displayed on the web screen 710 in a display format where the graph and the skeleton animation are displayed in conjunction with each other, as depicted in FIG. 16 to FIG. 21. Note that the web screen 710 depicted in FIG. 16 to FIG. 21 is merely an example applicable in the present invention. The type of sensor data to be displayed, the skeleton animation display method, the display position thereof, and the like may be arbitrarily set.

In the second display example of the exercise information according to the present embodiment, skeleton animations 721 and 722 (first information) are displayed on the left and the center in the middle area of the web screen 710 displayed on the display section of the user terminal 700 or the like, display item selection icons 724 and animation replay control icons 725 are displayed on the right thereof, and graphs (second information) 726 to 728 representing the time variation of sensor data obtained during running are displayed in the lower area, as depicted in FIG. 16 to FIG. 21.

The skeleton animations 721 and 722 are generated by analyzing each of the above-described analysis items based on sensor data obtained in a split section selected by the user US, and displayed together with numerical value data and guide lines (or auxiliary lines for description) for each analysis item. Here, in FIG. 16 to FIG. 21, the skeleton animation 721 reflects rear view images of the running form of the user US, and the skeleton animation 722 reflects side view images of the running form of the user US.

Figure 16:
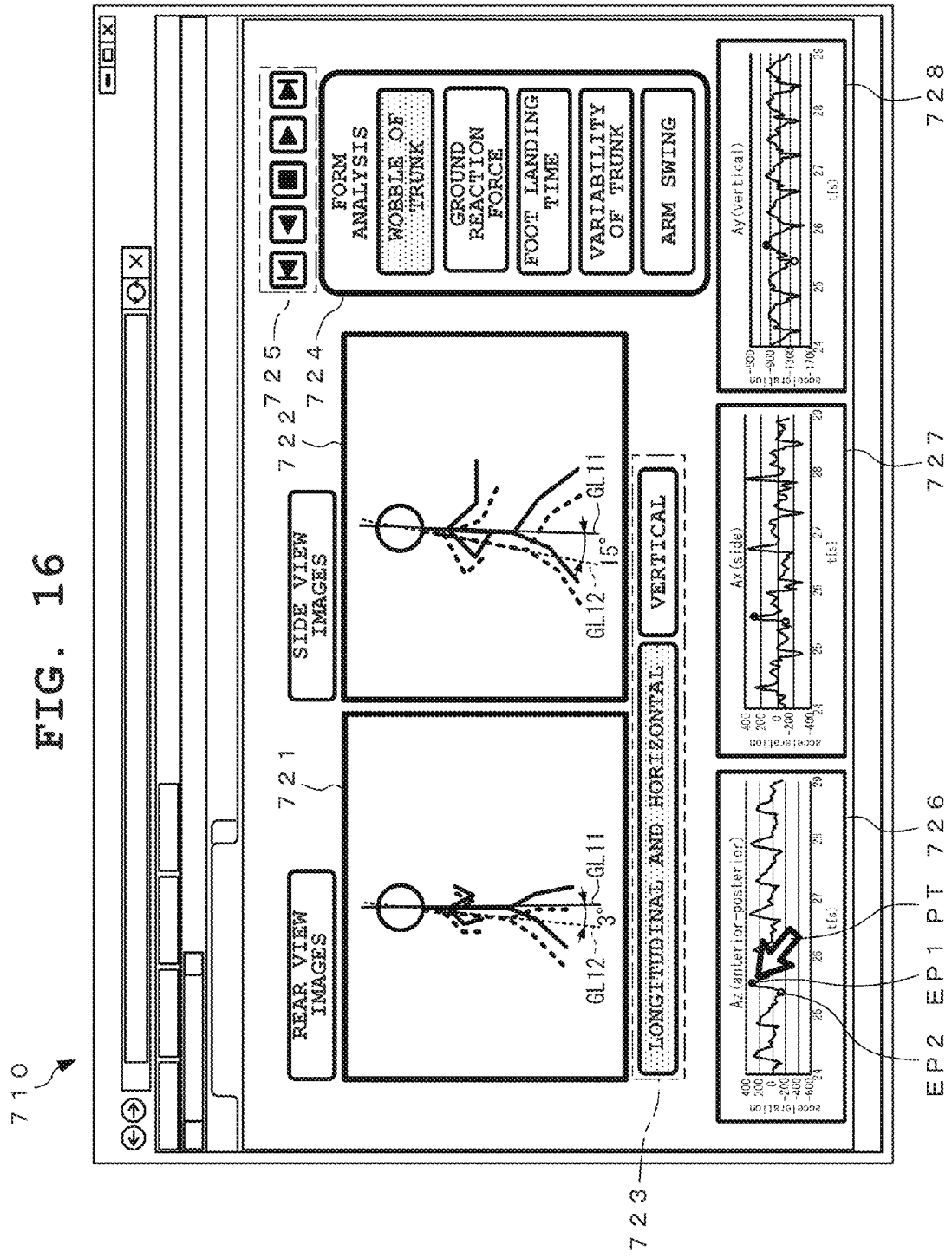
FIG. 16 is a first schematic view showing a second display example of the exercise information displayed on the user terminal or the like applied in the exercise information display system according to the embodiment.
Figure 17:
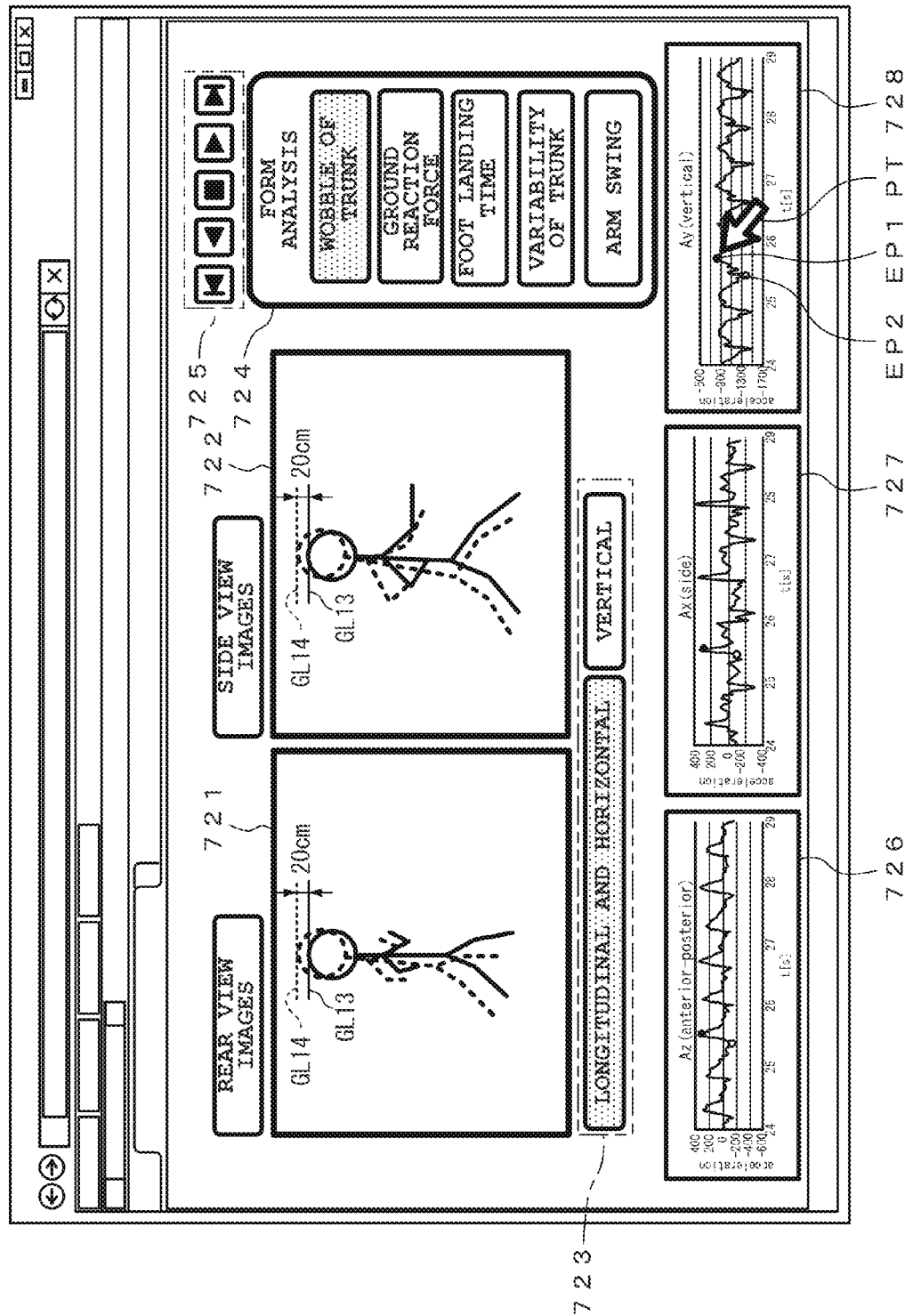
FIG. 17 is a second schematic view showing the second display example of the exercise information displayed on the user terminal or the like applied in the exercise information display system according to the embodiment.

Specifically, in the skeleton animations 721 and 722 depicted in FIG. 16, the wobble of a body trunk in the forward, rearward, leftward, and rightward directions during running (the maximum tilt in the forward direction and the maximum tilt in the rearward direction) (first information) is displayed by guide lines GL 11 and GL 12, and the magnitude of the wobble is displayed by an angle formed between the guide lines GL 11 and GL 12. Also, in the skeleton animations 721 and 722 depicted in FIG. 17, the wobble of the body trunk in the vertical direction (the maximum upward direction position and the maximum downward direction position) (first information) is displayed by guide lines GL 13 and GL 14, and the magnitude of the wobble is displayed by displacement (a space distance) between the guide lines GL 13 and GL 14. Here, the skeleton animations 721 and 722 depicted in FIG. 16 and FIG. 17 are switched to other display modes by, for example, operating one of animation display switching icons 723, or in other words, one of "longitudinal and horizontal" and "vertical" provided in the drawing.

Figure 18:
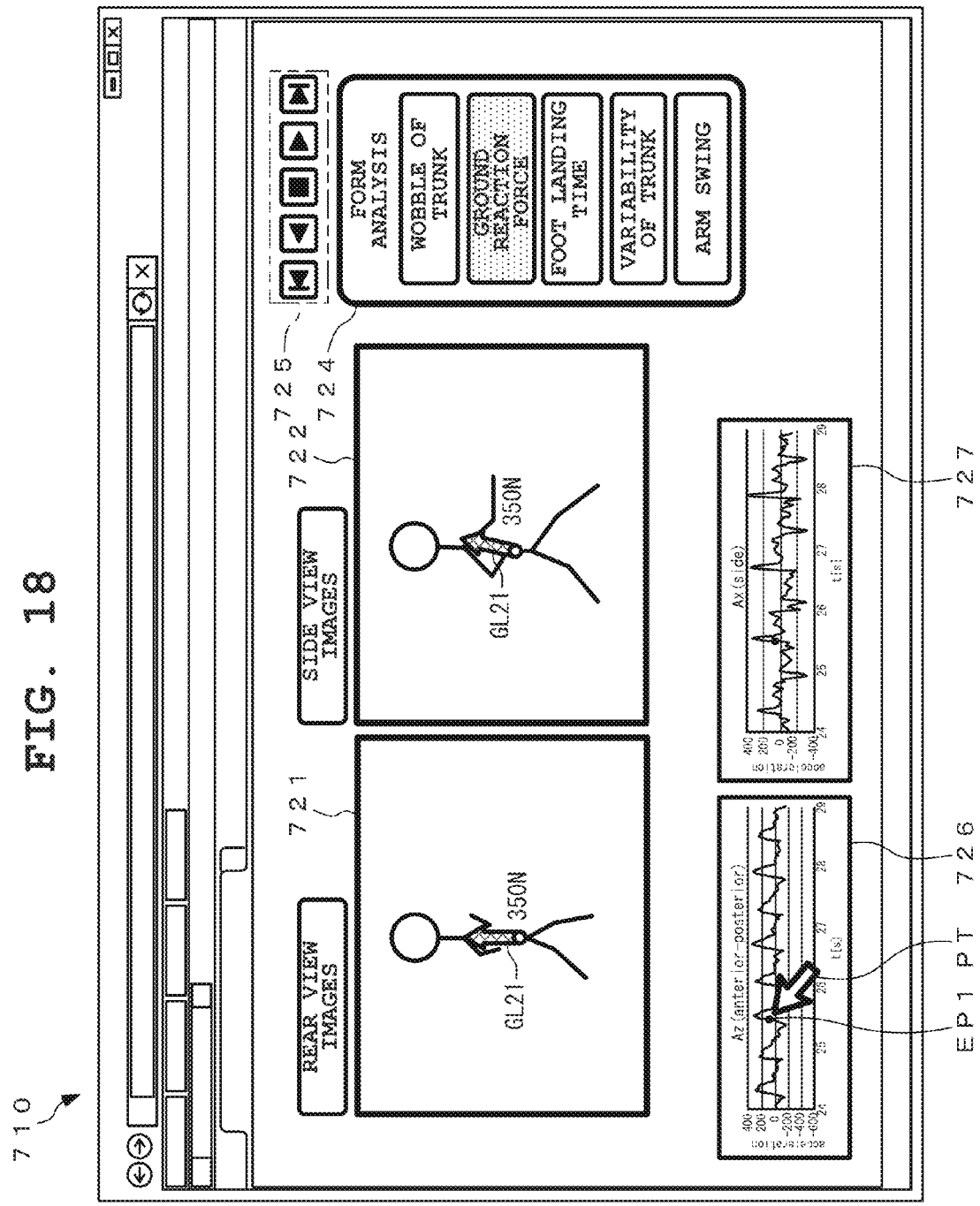
FIG. 18 is a third schematic view showing the second display example of the exercise information displayed on the user terminal or the like applied in the exercise information display system according to the embodiment.
Figure 19:
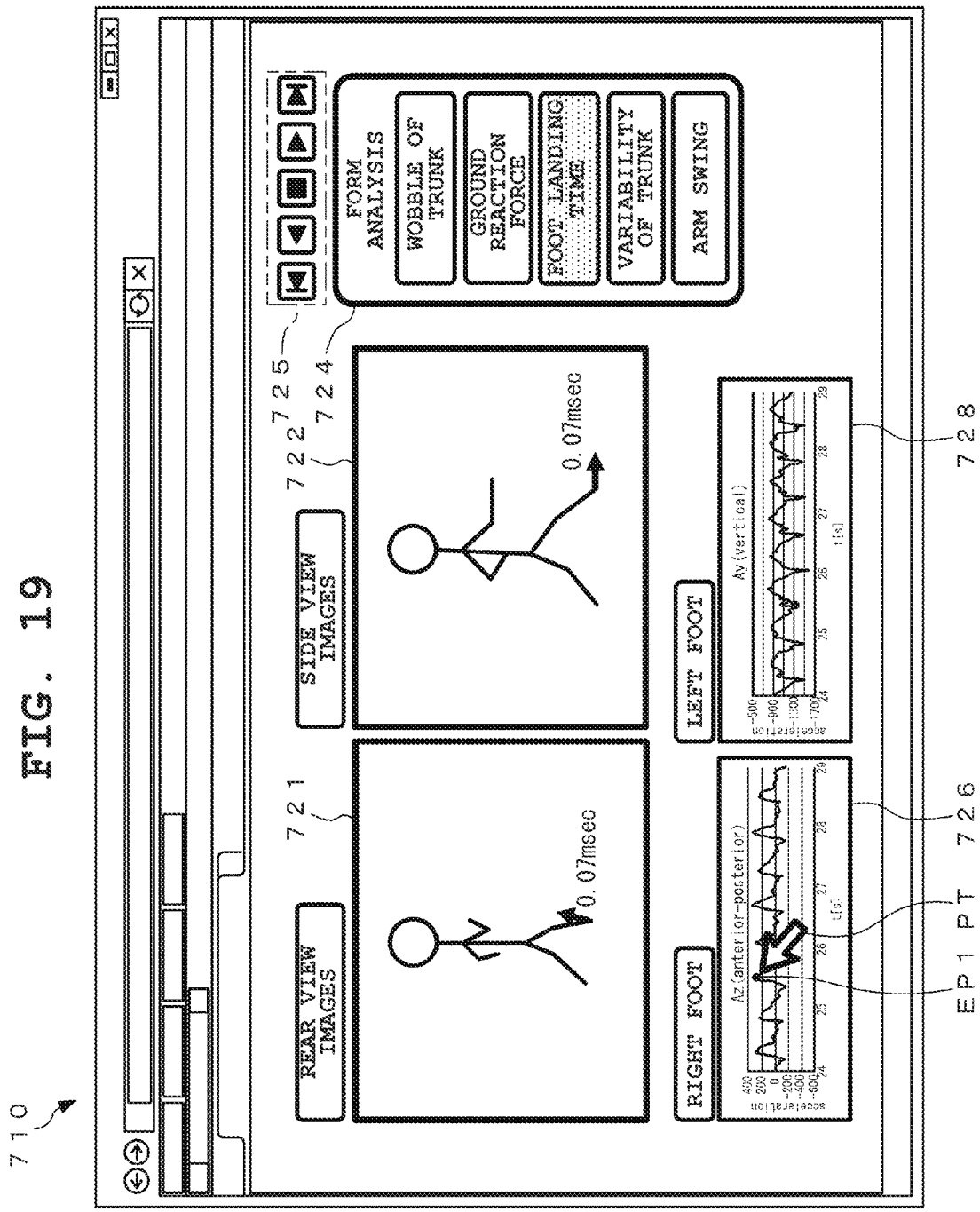
FIG. 19 is a fourth schematic view showing the second display example of the exercise information displayed on the user terminal or the like applied in the exercise information display system according to the embodiment.

In the skeleton animations 721 and 722 depicted in FIG. 18, ground reaction force (first information) is displayed by a vector (arrow) GL 21, and its magnitude is displayed by a numerical value. In the skeleton animations 721 and 722 depicted in FIG. 19, the landing times of the left and right feet (first information) are each displayed by the motion of animation (represented by an arrow for convenience of explanation in the drawing), and the length of each time is displayed by a numerical value. The orientations of arrows in FIG. 19 are traveling directions calculated based on data detected by the triaxial geomagnetic sensor 213 of the chest device 200. By defining the length of the arrow per unit time in advance and changing the length of the arrow according to the length of a foot landing time, the arrow reflects the numerical value data. The arrow in the rear view image in FIG. 19 indicates an orientation from the rear side to the forward side. In the lateral view image, an arrow whose starting point is a heel is described.

Figure 20:
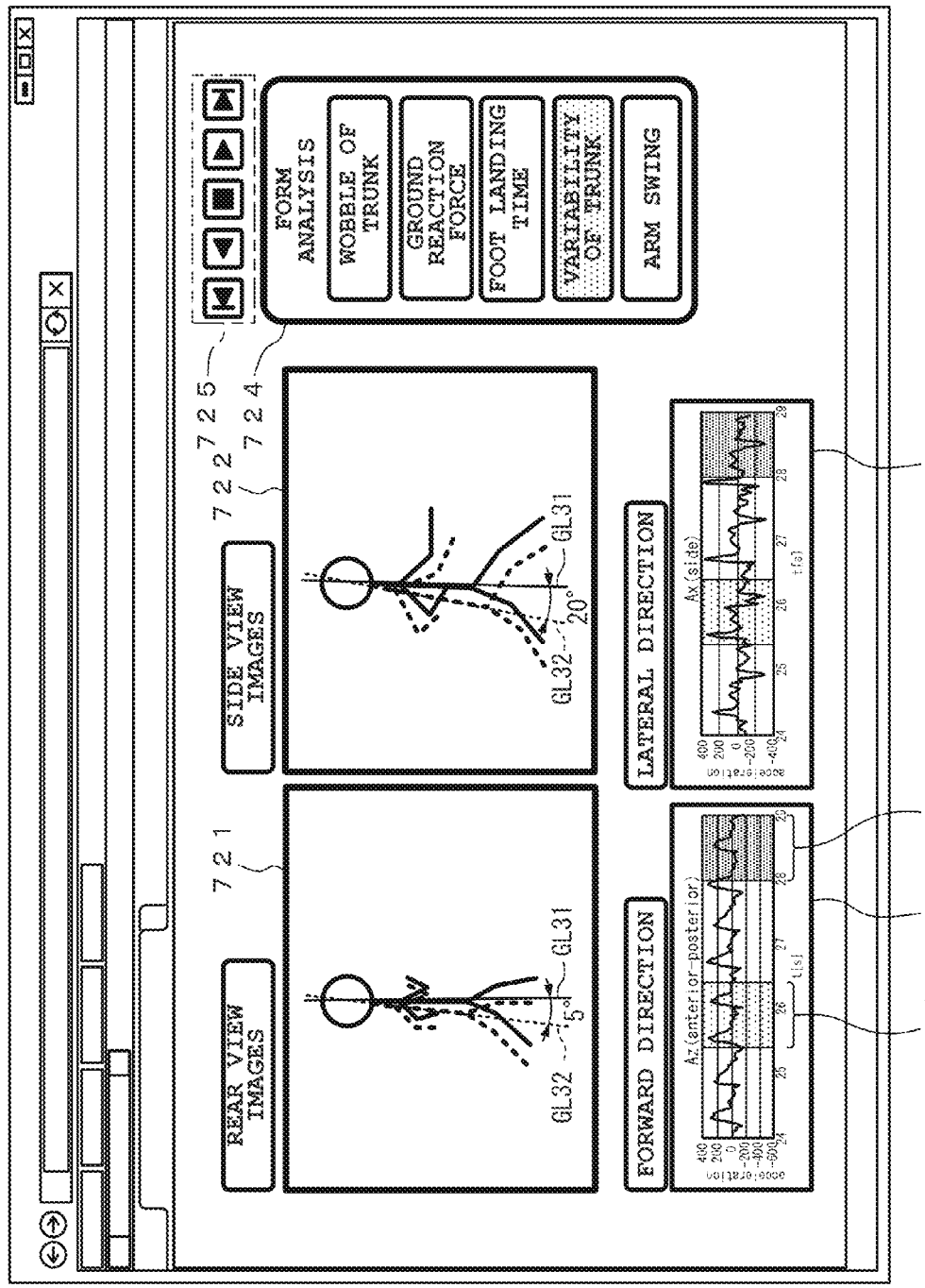
FIG. 20 is a fifth schematic view showing the second display example of the exercise information displayed on the user terminal or the like applied in the exercise information display system according to the embodiment.
Figure 21:
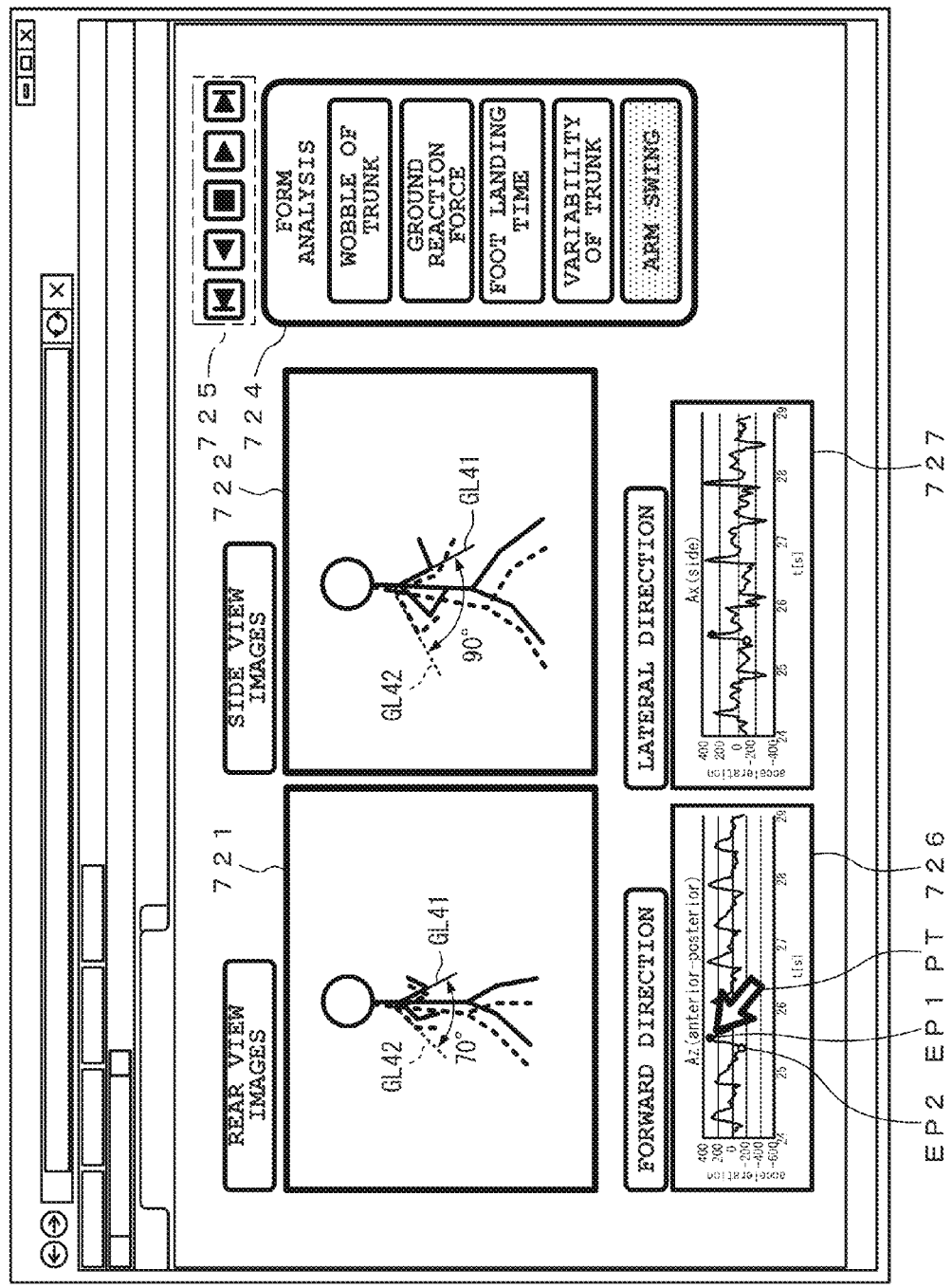
FIG. 21 is a sixth schematic view showing the second display example of the exercise information displayed on the user terminal or the like applied in the exercise information display system according to the embodiment.

In the skeleton animations 721 and 722 depicted in FIG. 20, the average of the wobbles of a body trunk in specific periods IV 1 and IV 2 (first information) is displayed as guide lines GL 31 and GL 32, and the magnitude of the variability of the body trunk (first information) is displayed by an angle formed between the guide lines GL 31 and GL 32. In the skeleton animations 721 and 722 depicted in FIG. 21, the swing of the left or right arm (a state where the user has fully swung his or her arm forward and a state where the user has fully pulled his or her arm back) (first information) is displayed by guide lines GL 41 and GL 42, and the magnitude of the swing (first information) is displayed by an angle formed between the guide lines GL 41 and GL 42.

The display item selection icons 724 are to select an analysis item regarding running form. By the user US performing an operation of selecting an arbitrary analysis item, the skeleton animations 721 and 722 and the graphs 726 to 728 representing the time variation of sensor data which correspond to the selected analysis item are displayed.

The animation replay control icons 725 are to perform display control over the skeleton animations 721 and 722, such as fast-rewind, rewind, stop, replay, and fast-forward. By the operation of the user US, the skeleton animations 721 and 722 can be operated at an arbitrary speed.

The graphs 726 to 728 represent the time variation of sensor data (in particular, data of acceleration in triaxial directions) used in the generation of the skeleton animations 721 and 722 for each analysis item depicted in FIG. 16 to FIG. 21. These graphs 726 to 728 are displayed such that the positions of markers EP 1 and EP 2 on the sensor data therein are moved corresponding to the motions of the skeleton animations 721 and 722.

In the second display example of the above-described exercise information, the user US first performs a specifying operation (for example, a click operation) on an arbitrary analysis item of the display item selection icons 724 by the mouse pointer PT, the touch panel, or the like. By this operation, the skeleton animations 721 and 722 and the graphs 726 to 728 representing the time variation of sensor data which correspond to the selected analysis item are displayed, as depicted in FIG. 16 to FIG. 21.

Next, when the user US performs a specifying operation on, for example, a replay button of the animation replay control icons 725 by the mouse pointer PT, the touch panel, or the like, the skeleton animations 721 and 722 for a period from the starting point to the endpoint of the spit section (for example, the split section "6") selected in the first display example is replayed. Here, in conjunction with the playback of the skeleton animations 721 and 722, the positions of the markers EP 1 and EP 2 displayed on the sensor data of the graphs 726 to 728 are moved. Also, by the user US specifying one of the fast-rewind, rewind, stop, and fast-forward buttons of the animation replay control icons 725, the replay speed and the replay position of the skeleton animations 721 and 722 can be arbitrarily changed. Moreover, by the user US performing a specifying operation on an arbitrary position on the sensor data in the graphs 726 to 728 by the mouse pointer PT, the touch panel, or the like, the markers EP 1 and EP 2 are moved to the specified positions, and the skeleton animations 721 and 722 corresponding to the sensor data of those positions are replayed, as depicted in FIG. 16 to FIG. 21.

As such, in the present embodiment, various sensor data and the like are collected during the exercise (running) of the user US, and the sensor data and the like and various exercise information generated based on the analysis results of the sensor data and the like are displayed on the user terminal 700 or the like in a form of numerical values, graph, map, animation, and the like. In particular, in the present embodiment, based on the analysis results of the sensor data and the like, animation reflecting the exercise posture (running form) of the user US is generated for each of various analysis items. Then, this animation is displayed on one screen in the display section of the user terminal 700 or the like in a display format where it is displayed in conjunction with a graph representing the time variation of the sensor data (acceleration data).

Therefore, according to the present embodiment, when performing an exercise such as running, the user US can instantly, easily, and accurately grasp various exercise information displayed in conjunction with each other, by the user terminal 700 or the like. In particular, since animation reflecting the actual exercise posture of the user US is displayed for each of various analysis items indicating components of the exercise posture, the user US can visually grasp which exercise posture has been taken and at which point this exercise posture has been taken during the exercise, and judge which analysis item has a problem. Accordingly, the user US can objectively perform self analysis, and thereby can easily grasp his or her feature, tendency, and the like in an exercise, and reflect it in the improvement of an exercise method thereafter.

Also, in the present embodiment, in the network server 500 connected to the network 400, the processing for analyzing sensor data obtained during an exercise and the processing for generating form data are performed and, when a request is received from the user terminal 700 or the like, various exercise information are displayed on the web screen in a display format where they are displayed in conjunction with each other. Because of this configuration, the user terminal 700 for use by the user US may be any device as long as it has the structure of or a structure equivalent to a general-purpose network communication device having incorporated therein a web browser which is viewing software, and is not required to include hardware or software for the processing for analyzing sensor data and like and the processing for generating form data. Therefore, the exercise information display system according to the present embodiment can be achieved with a simple structure. In addition, because of this configuration where the processing for analyzing sensor data and the processing of generating form data are performed in the network server 500 connected to the network 400, complex analysis and processing can be achieved within a short period of time. Therefore, the exercise status of the user can be more accurately grasped and can be analyzed in more detail.

Next, modification examples of the above-described embodiment are described.

First Modification Example

Figure 22:
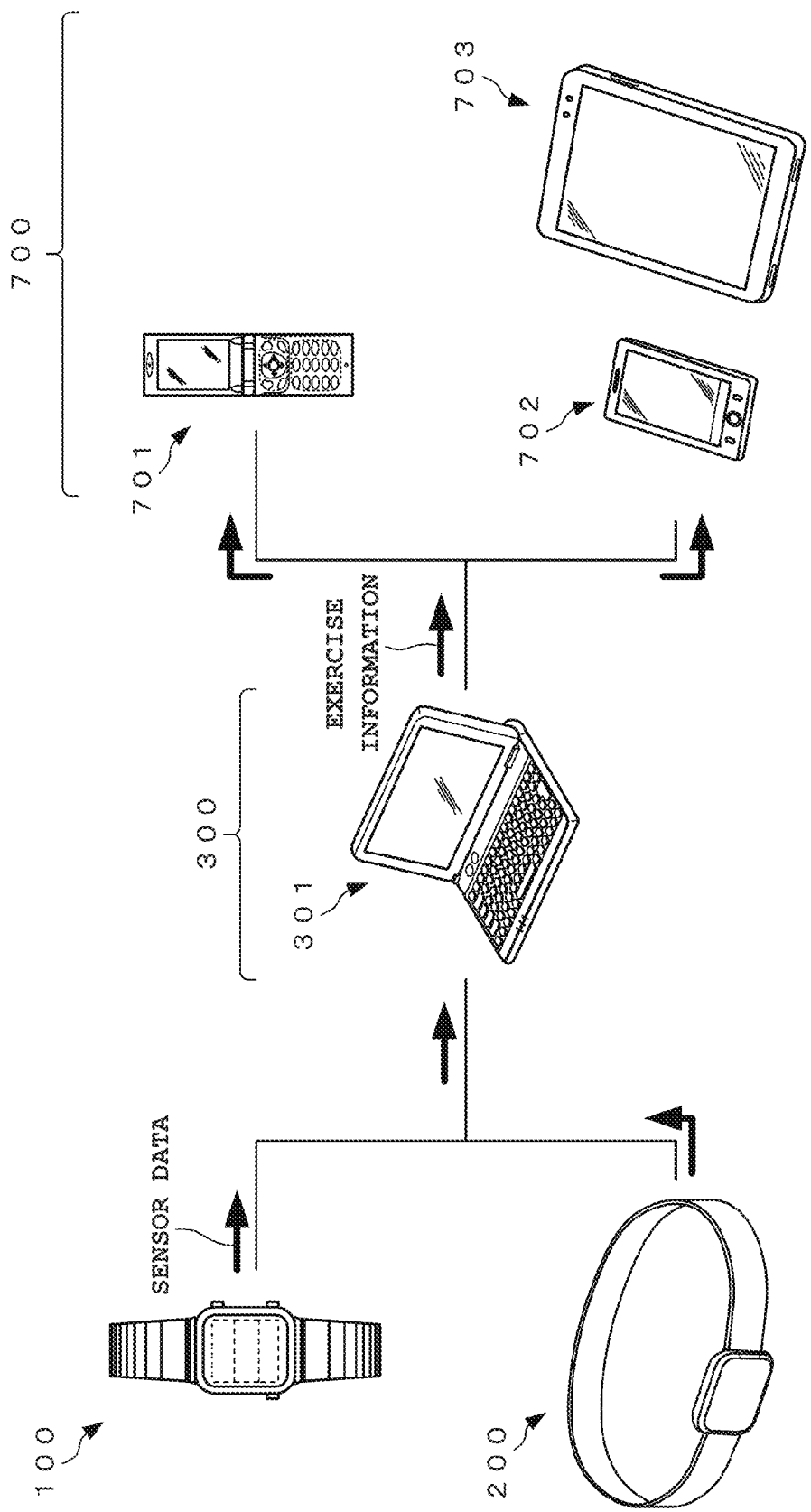
FIG. 22 is a schematic structural diagram showing a modification example of the exercise information display system according to the embodiment.

FIG. 22 is a schematic structural diagram showing a modification example of the exercise information display system according to the above-described embodiment. Here, components equivalent to those of the above-described embodiment (refer to FIG. 1) are provided with the same reference numerals and their descriptions are simplified.

The above-described embodiment includes a so-called cloud-computing-type system where sensor data and the like obtained by the wrist device 100 and the chest device 200 are transferred via the information communication terminal 300 to the network server 500 connected to the network 400, analyzed and processed in the network server 500, and provided to the user terminal 700.

However, the present invention is not limited thereto, and a configuration may be adopted in which sensor data and the like obtained by the wrist device 100 and the chest device 200 are analyzed and processed directly by the information communication terminal 300 and displayed on the display section of the user terminal 700 or the information communication terminal 300 so as to be provided to the user US.

Specifically, the exercise information display system according to the present modification example mainly includes the wrist device 100 and the chest device 200, the information communication terminal 300, and the user terminal 700 as depicted in FIG. 22, and the information communication terminal 300 has processing functions equivalent to the processing for analyzing and processing sensor data and the like which are performed in the network server 500 in the above-described embodiment.

In this exercise information display system, firstly, sensor data and the like are obtained by the wrist device 100 and the chest device 200, and transferred to the information communication terminal 300, as depicted in FIG. 22. Next, in the information communication terminal 300, the transferred sensor data and the like are analyzed and processed to generate various exercise information including form data. Then, the generated exercise information are displayed on the display section 340 of the information communication terminal 300 in a predetermined display format such as that described in the above-described display example. Also, the exercise information including the form data are transmitted to the user terminal 700 such as the portable telephone 701, the smartphone 702, or the tablet terminal 703 connected to the information communication terminal 300 by a predetermined communication scheme, and displayed on the display section of the user terminal 700 in a predetermined display format. In this case, the method for transmitting various exercise information from the information communication terminal 300 to the user terminal 700 may be a method in which the transmission is performed by mutual direct connection via wireless communication, infrared communication, a communication cable, or the like, a method in which the transmission is performed via a network such as a portable phone network or the Internet, or a method in which the transmission is performed by data being sent via a memory card or the like.

In this configuration, sensor data and the like obtained by the wrist device 100 and the chest device 200 are transferred to the information communication terminal 300, and the analysis and the processing thereof are performed in this information communication terminal 300. Therefore, the time required for transferring sensor data and the like can be reduced. Also, since no network connection environment is required, even in a case where the information communication terminal 300 does not have a network connecting function or even in a situation where network connection is impossible, sensor data and the like can be analyzed, and various exercise information including form data can be generated, whereby appropriate information can be provided to the user.

In FIG. 22, as the information communication terminal 300 that analyzes and processes sensor data and the like transferred from the wrist device 100 and the chest device 200, the personal computer 301 with relatively high computation performance has been adopted from among the information communication terminals 300 depicted in FIG. 1. However, another terminal such as a smartphone or tablet terminal may be adopted, depending on the contents of computation processing or when the terminal has a high computation capability.

Second Modification Example

In the above-described embodiment, sensor data and the like obtained by the wrist device 100 and the chest device 200 and transferred to the network server 500 via the information communication terminal 300 are used to perform analysis, and various exercise information including form data (skeleton animation) generated based on the analysis results are displayed on the display section of the user terminal 700 and the information communication terminal 300.

However, the present invention is not limited thereto, and a configuration may be adopted in which a request for verification of sensor data and the like transferred to the network server 500, the analysis results thereof, various exercise information generated based thereon is made to an expert (for example, a coach or instructor), and an advice from the expert is displayed together with the exercise information on the display section of the user terminal 700 or the information communication terminal 300.

With this configuration, the user's own exercise status, exercise posture, and the like can be more accurately grasped with reference to an advice and the like from an expert, which can be reflected in the improvement of an exercise method thereafter.

In the embodiment and the modification examples described above, the wrist device 100 that is worn on a wrist and the chest device 200 that is worn on a chest have been adopted as sensor devices in the present invention. However, the present invention is not limited thereto, and another sensor device may be adopted as long as it can obtain sensor data and the like indicating the motion status and the biological information of the human-body during an exercise. For example, a sensor device that is worn on an upper arm, an ankle, a hip, a shoelace, or the like may be adopted.

Also, in the embodiment described above, running is exemplarily described as an exercise to which the exercise determination device is applied. However, the present invention is not limited thereto and may be applied to various exercises, such as walking, cycling, trekking, and mountaineering.

While the present invention has been described with reference to the preferred embodiments, it is intended that the invention be not limited by any of the details of the description therein but includes all the embodiments which fall within the scope of the appended claims.

What is claimed is:
1. An exercise information display system comprising:
 a sensor device which obtains data associated with a motion status of a human body during an exercise;
 a data processing device which generates plural types of exercise information based on the data obtained by the sensor device; and
 a viewing device which displays, from among the plural types of exercise information, at least first information indicating a posture of the human body during the exercise and second information associated with the first information in a display format where the first information and the second information are displayed in conjunction with each other,
wherein:
(i) the data processing device generates, as the first information, two maximum tilts each of which is a maximum tilt of a reference axis of a body trunk of the human body during the exercise and which are formed such that one direction where one maximum tilt is formed and a direction where the other maximum tilt is formed are opposite to each other, and the viewing device simultaneously displays two guide lines which respectively represent the two maximum tilts and an angle formed therebetween which represents a magnitude of a wobble of the body trunk, on two animations by a skeleton model which reflect the posture of the human body during the exercise and each of which corresponds to the two guide lines, such that the two guide lines are overlapped with the each of the two animations;
(ii) the data processing device generates, as the first information, a maximum upward direction position and a maximum downward direction position of a body trunk of the human body during the exercise, and the viewing device simultaneously displays two guide lines which respectively represent the maximum upward direction position and the maximum downward direction position and a distance therebetween which represents a magnitude of a wobble of the body trunk, on two animations by a skeleton model which reflect the posture of the human body during the exercise and each of which corresponds to the two guide lines, such that the two guide lines are overlapped with the each of the two animations;
(iii) the data processing device generates, as the first information, a ground reaction force received by the human body during the exercise, and the viewing device displays the ground reaction force by a vector, on an animation by a skeleton model which reflects the posture of the human body during the exercise, such that the ground reaction force is overlapped with the animation;
(iv) the data processing device generates, as the first information, a landing time of the human body during the exercise, and the viewing device displays the landing time by a vector, on an animation by a skeleton model which reflects the posture of the human body during the exercise, such that the landing time is overlapped with the animation;
(v) the data processing device generates, as the first information, two averages each of which is an average of a tilt of the human body and which are respectively obtained in different periods during the exercise, and the viewing device simultaneously displays two guide lines which respectively represent the two averages and an angle formed therebetween which represents a magnitude of a variability of the body trunk, on two animations by a skeleton model which reflect the posture of the human body during the exercise and each of which corresponds to the two guide lines, such that the two guide lines are overlapped with the each of the two animations; or
(vi) the data processing device generates, as the first information, swings of a left or a right arm of the human body each of which is obtained in respective different periods during the exercise, and the viewing device simultaneously displays two guide lines which respectively represent the swings of the arm and an angle formed therebetween which represents a magnitude of the swings of the arm, on two animations by a skeleton model which reflect the posture of the human body during the exercise and each of which corresponds to the two guide lines, such that the two guide lines are overlapped with the each of the two animations.

2. The exercise information display system according to claim 1, wherein the data processing device has a data analyzing section which analyzes the data obtained by the sensor device regarding a plurality of items representing components of the posture of the human body during the exercise and generates the first information for each of the plurality of items based on analysis results.

3. The exercise information display system according to claim 2, wherein the data processing device generates, as the first information, an animation by a skeleton model for each of the plurality of items.

4. The exercise information display system according to claim 3, wherein the data processing device generates the animation by the skeleton model by analyzing the data for each motion element of the human body during the exercise, extracting unit images reflecting the posture, and synthesizing the unit images in time series.

5. The exercise information display system according to claim 2, wherein the data processing device generates, as the second information, a graph representing time variation of the data used for generating the first information for each of the plurality of items.

6. The exercise information display system according to claim 1, wherein the sensor device has at least an acceleration sensor which detects acceleration of the human body in triaxial directions during the exercise and outputs first sensor data, and an angular velocity sensor which detects angular velocities of the human body in triaxial directions during the exercise and outputs second sensor data, and wherein the data processing device has an exercise information generating section which generates the first information based on the first sensor data and the second sensor data and generates the second information based on the first sensor data.

7. The exercise information display system according to claim 1, wherein the data processing device transmits the first information and the second information which are displayed in conjunction with each other to the viewing device, in response to a request from the viewing device.

8. The exercise information display system according to claim 1, wherein the sensor device, the data processing device, and the viewing device are connected to a network, wherein the data processing device generates the plural types of exercise information based on the data obtained by the sensor device and transmitted via the network, and wherein the viewing device displays the first information and the second information transmitted from the data processing device via the network such that the first information and the second information are displayed in conjunction with each other.

9. An exercise information display method comprising:
a step of obtaining data associated with a motion status of a human body during an exercise;
a step of generating plural types of exercise information based on the obtained data; and
a step of displaying, from among the plural types of exercise information, at least first information indicating a posture of the human body during the exercise and second information associated with the first information in a display format where the first information and the second information are displayed in conjunction with each other, wherein:
(i) the step of generating generates, as the first information, two maximum tilts each of which is a maximum tilt of a reference axis of a body trunk of the human body during the exercise and which are formed such that one direction where one maximum tilt is formed and a direction where the other maximum tilt is formed are opposite to each other, and the step of displaying simultaneously displays two guide lines which respectively represent the two maximum tilts and an angle formed therebetween which represents a magnitude of a wobble of the body trunk, on two animations by a skeleton model which reflect the posture of the human body during the exercise and each of which corresponds to the two guide lines, such that the two guide lines are overlapped with the each of the two animations;

(ii) the step of generating generates, as the first information, a maximum upward direction position and a maximum downward direction position of a body trunk of the human body during the exercise, and the step of displaying simultaneously displays two guide lines which respectively represent the maximum upward direction position and the maximum downward direction position and a distance therebetween which represents a magnitude of a wobble of the body trunk, on two animations by a skeleton model which reflect the posture of the human body during the exercise and each of which corresponds to the two guide lines, such that the two guide lines are overlapped with the each of the two animations;

(iii) the step of generating generates, as the first information, a ground reaction force received by the human body during the exercise, and the step of displaying displays the ground reaction force by a vector, on an animation by a skeleton model which reflects the posture of the human body during the exercise, such that the ground reaction force is overlapped with the animation;

(iv) the step of generating generates, as the first information, a landing time of the human body during the exercise, and the step of displaying displays the landing time by a vector, on an animation by a skeleton model which reflects the posture of the human body during the exercise, such that the landing time is overlapped with the animation;

(v) the step of generating generates, as the first information, two averages each of which is an average of a tilt of the human body and which are respectively obtained in different periods during the exercise, and the step of displaying simultaneously displays two guide lines which respectively represent the two averages and an angle formed therebetween which represents a magnitude of a variability of the body trunk, on two animations by a skeleton model which reflect the posture of the human body during the exercise and each of which corresponds to the two guide lines, such that the two guide lines are overlapped with the each of the two animations; or (vi) the step of generating generates, as the first information, swings of a left or a right arm of the human body each of which is obtained in respective different periods during the exercise, and the step of displaying simultaneously displays two guide lines which respectively represent the swings of the arm and an angle formed therebetween which represents a magnitude of the swings of the body trunk arm, on two animations by a skeleton model which reflect the posture of the human body during the exercise and each of which corresponds to the two guide lines, such that the two guide lines are overlapped with the each of the two animations.

10. A non-transitory computer-readable storage medium having stored thereon an exercise information display program that is executable by a computer, the program being executable by the computer to perform functions comprising:

processing for generating plural types of exercise information based on data associated with a motion status of a human body during an exercise; and processing for displaying, from among the plural types of exercise information, at least first information indicating a posture of the human body during the exercise and second information associated with the first information in a display format where the first information and the second information are displayed in conjunction with each other, wherein:

(i) the processing for generating generates, as the first information, two maximum tilts each of which is a maximum tilt of a reference axis of a body trunk of the human body during the exercise and which are formed such that one direction where one maximum tilt is formed and a direction where the other maximum tilt is formed are opposite to each other, and the processing for displaying simultaneously displays two guide lines which respectively represent the two maximum tilts and an angle formed therebetween which represents a magnitude of a wobble of the body trunk, on two animations by a skeleton model which reflect the posture of the human body during the exercise and each of which corresponds to the two guide lines, such that the two guide lines are overlapped with the each of the two animations;

(ii) the processing for generating generates, as the first information, a maximum upward direction position and a maximum downward direction position of a body trunk of the human body during the exercise, and the processing for displaying simultaneously displays two guide lines which respectively represent the maximum upward direction position and the maximum downward direction position and a distance therebetween which represents a magnitude of a wobble of the body trunk, on two animations by a skeleton model which reflect the posture of the human body during the exercise and each of which corresponds to the two guide lines, such that the two guide lines are overlapped with the each of the two animations;

(iii) the processing for generating generates, as the first information, a ground reaction force received by the human body during the exercise, and the processing for displaying displays the ground reaction force by a vector, on an animation by a skeleton model which reflects the posture of the human body during the exercise, such that the ground reaction force is overlapped with the animation;

(iv) the processing for generating generates, as the first information, a landing time of the human body during the exercise, and the processing for displaying displays the landing time by a vector, on an animation by a skeleton model which reflects the posture of the human body during the exercise, such that the landing time is overlapped with the animation;

(v) the processing for generating generates, as the first information, two averages each of which is an average of a tilt of the human body and which are respectively obtained in different periods during the exercise, and the processing for displaying simultaneously displays two guide lines which respectively represent the two averages and an angle formed therebetween which represents a magnitude of a variability of the body trunk, on two animations by a skeleton model which reflect the posture of the human body during the exercise and each of which corresponds to the two guide lines, such that the two guide lines are overlapped with the each of the two animations; or (vi) the processing for generating generates, as the first information, swings of a left or a right arm of the human body each of which is obtained in respective different periods during the exercise, and the processing for displaying simultaneously displays two guide lines which respectively represent the swings of the arm and an angle formed therebetween which represents a magnitude of the swings of the arm, on two animations by a skeleton model which reflect the posture of the human body during the exercise and each of which corresponds to the two guide lines, such that the two guide lines are overlapped with the each of the two animations.

* * * * *

UNITED STATES PATENT AND TRADEMARK OFFICE
CERTIFICATE OF CORRECTION

PATENT NO. : 9,656,119 B2  
APPLICATION NO. : 14/137192  
DATED : May 23, 2017  
INVENTOR(S) : Kazuo Ura et al.

Page 1 of 1

It is certified that error appears in the above-identified patent and that said Letters Patent is hereby corrected as shown below:

In the Claims

Column 29, Line 5, after "the" delete "body trunk".

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*